United States Patent
Tarr et al.

(10) Patent No.: US 10,507,921 B2
(45) Date of Patent: Dec. 17, 2019

(54) PROVISIONING CART FOR ON-AIRCRAFT RESTOCKING

(71) Applicant: Southwest Airlines Co., Dallas, TX (US)

(72) Inventors: Daniel Tarr, Dallas, TX (US); Charles Griffith, Orlando, FL (US); Alberto Cruz, Kissimmee, FL (US); Helen Greer, Celebration, FL (US)

(73) Assignee: Southwest Airlines Co., Dallas, TX (US)

(*) Notice: Subject to any disclaimer, the term of this patent is extended or adjusted under 35 U.S.C. 154(b) by 0 days.

(21) Appl. No.: 16/192,523

(22) Filed: Nov. 15, 2018

(65) Prior Publication Data

US 2019/0144117 A1     May 16, 2019

Related U.S. Application Data

(60) Provisional application No. 62/586,802, filed on Nov. 15, 2017.

(51) Int. Cl.
  *B62B 3/00*    (2006.01)
  *B64D 11/00*   (2006.01)
  *A47B 31/06*   (2006.01)
  *A47B 31/00*   (2006.01)

(52) U.S. Cl.
  CPC .......... *B64D 11/0007* (2013.01); *B62B 3/005* (2013.01); *A47B 31/06* (2013.01); *A47B 2031/002* (2013.01); *B62B 2202/023* (2013.01); *B62B 2301/04* (2013.01)

(58) Field of Classification Search
  CPC .. B62B 3/005; B62B 5/06; B62B 3/02; B64D 11/0007; B64D 31/06
  See application file for complete search history.

(56) References Cited

U.S. PATENT DOCUMENTS

| | | | | |
|---|---|---|---|---|
| 2,023,730 A * | 12/1935 | Heise | ...................... | B60P 1/003 298/24 |
| 3,533,536 A | 10/1970 | Baxendale | | |
| 4,483,486 A * | 11/1984 | Magda | ................... | A01M 11/00 239/150 |
| 5,527,075 A * | 6/1996 | Jones | ................... | A63B 47/021 294/19.2 |
| 6,759,959 B2 * | 7/2004 | Wildman | .............. | B65F 1/0033 340/3.1 |
| 7,537,426 B1 * | 5/2009 | Dunn | ........................ | B62B 3/02 414/414 |
| 8,360,447 B2 | 1/2013 | Knoppers | | |

(Continued)

*Primary Examiner* — Hau V Phan

(57) ABSTRACT

A cart for restocking provisions includes a body having one or more exterior surfaces. The one or more exterior surfaces include a top surface facing a first direction and a bottom surfacing facing a second direction that is away from the first direction and parallel to the first direction. The cart also includes a handle fixedly attached to the body. The cart further includes one or more wheels coupled to the bottom surface. In addition, the cart includes one or more hoppers each including a hollow space having a length that extends from an aperture located on the top surface and through at least a portion of an interior of the body. The hollow space includes at least one curved surface that extends from the aperture along at least a portion of the length to allow the provisions to be stored within the one or more hoppers.

23 Claims, 12 Drawing Sheets

(56) References Cited

U.S. PATENT DOCUMENTS

| | | | | |
|---|---|---|---|---|
| 8,602,711 B1* | 12/2013 | Nash | .................... | A63B 47/021 294/19.2 |
| 9,114,285 B2* | 8/2015 | Guo | .................... | A63B 47/021 |
| 2006/0042611 A1* | 3/2006 | Karellas | ............... | A63B 69/002 124/16 |
| 2006/0108757 A1 | 5/2006 | Brookmire et al. | | |
| 2006/0272181 A1* | 12/2006 | Donaldson | .............. | E01H 4/023 37/219 |
| 2014/0147584 A1* | 5/2014 | Whitten | ................. | E04D 7/005 427/186 |
| 2014/0151971 A1* | 6/2014 | Workman | ................ | B62B 5/06 280/47.31 |

\* cited by examiner

PROVISIONING CART FOR ON-AIRCRAFT RESTOCKING

CROSS-REFERENCE TO RELATED APPLICATION AND PRIORITY CLAIM

This application claims priority under 35 U.S.C. § 119(e) to U.S. Provisional Patent Application No. 62/586,802 filed on Nov. 15, 2017 and entitled "PROVISIONING CART FOR ON-AIRCRAFT RESTOCKING." The above-identified provisional patent application is hereby incorporated by reference in its entirety.

TECHNICAL FIELD

This disclosure generally relates to a provisioning cart for restocking provisions on a transport vehicle such as an aircraft.

BACKGROUND

Commercial airlines commonly stock aircraft with a variety of products or provisions including food, drinks, ice, bathroom items, plastic cups, plates, and eating utensils, and other items to be used by passengers and the crew. To restock an aircraft, provisioning agents must carry provisions back and forth from storage to the aircraft, which can include 8 to 12 trips or more. Restocking typically is performed regardless of conditions such as heat, rain, snow, darkness, or the like which can increase restocking time, and can lead to provisioning agent injuries.

SUMMARY

This disclosure provides a provisioning cart for restocking a transport vehicle such as an aircraft.

In a first embodiment, a cart for restocking provisions is provided. The cart includes a body having one or more exterior surfaces. The one or more exterior surfaces include a top surface facing a first direction and a bottom surfacing facing a second direction that is away from the first direction and parallel to the first direction. The cart also includes a handle fixedly attached to the body. The cart further includes one or more wheels coupled to the bottom surface. In addition, the cart includes one or more hoppers each including a hollow space having a length that extends from an aperture located on the top surface and through at least a portion of an interior of the body. The hollow space includes at least one curved surface that extends from the aperture along at least a portion of the length to allow the provisions to be stored within the one or more hoppers.

In a second embodiment, a cart for restocking provisions is provided. The cart includes a body having one or more exterior surfaces. The one or more exterior surfaces include a top surface facing a first direction, a bottom surfacing facing a second direction that is away from the first direction and parallel to the first direction, and a side surface facing a third direction that is not parallel to the first direction and the second direction. The cart also includes a handle fixedly attached to the body. The cart further includes one or more wheels coupled to the bottom surface. In addition, the cart includes one or more hoppers each including a hollow space having a length that extends from a first aperture located on the top surface, through an interior of the body, and to a second aperture located on the side surface. The hollow space includes at least one curved surface that extends from the first aperture along at least a portion of the length to allow the provisions to be stored within the one or more hoppers.

In a third embodiments, a cart for restocking provisions is provided. The cart includes a body having one or more exterior surfaces. The cart also includes a handle fixedly attached to the body. The cart further includes one or more wheels coupled to the body. In addition, the cart includes one or more hoppers each including a hollow space having a length that extends from an aperture located on at least one exterior surface of the one or more exterior surfaces and through at least a portion of an interior of the body. The hollow space includes at least one curved surface that extends from the aperture along the length to allow the provisions to be stored within the one or more hoppers.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1-12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
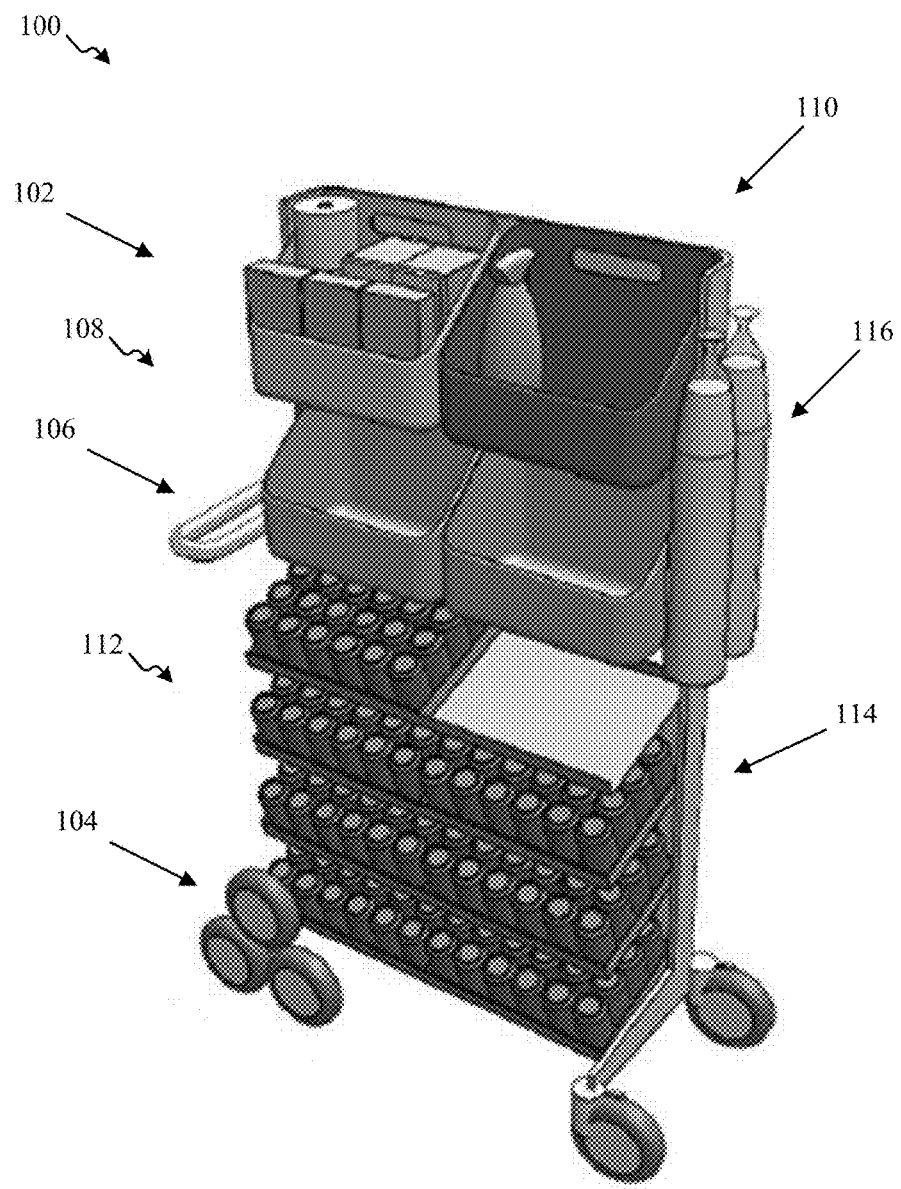
FIG. 1 illustrates a perspective view of a non-limiting, example provisioning cart according to certain embodiments of this disclosure.

FIG. 1 illustrates a perspective view of a non-limiting, example provisioning cart 100 according to certain embodiments of this disclosure. The embodiment of the provisioning cart 100 shown in FIG. 1 is for illustration only. Other embodiments of the provisioning cart 100 could be used without departing from the scope of this disclosure. For example, the provisioning cart 100 illustrated in FIG. 1 may include one or more same or similar features of any other provisioning cart or component described or illustrated herein. It should be understood that provisioning carts and components described herein may be used for transport vehicles including buses, trains, aircraft, or the like. Additionally, or alternatively, provisioning carts and components described herein may be used for transporting provisions into or within structures such as hospitals, office buildings, apartments, hotels, arenas, stadiums, convention centers, and other similar buildings and structures. A person having ordinary skill in the art would understand the various applications by which provisioning carts and components described herein may be used.

As illustrated in FIG. 1, the provisioning cart 100 may include a frame 102 onto which various containers, shelves, and other components (e.g., drawers) for holding provisions may be installed. The frame 102 may also have attached thereto a plurality of wheels 104 for providing the provisioning cart 100 with maneuverability, and a handle 106 capable of being grabbed by a user for pushing and otherwise handling the provisioning cart 100. The various components installed on the frame 102 may hold provisions such as toiletries, food, drink cans, or the like. In the embodiment illustrated in FIG. 1, the provisioning cart 100 may include one or more upper sections 108 of the frame 102 configured for installation of bins 110 for holding items such as food, toiletries, or the like. In the embodiment illustrated in FIG. 1, the provisioning cart 100 may include one or more lower sections 112 of the frame 102 configured for installation of shelves 114 disposed below the one or more upper sections 108 where the bins 110 are installed, the shelves 114 configured to store items such as drink cans. The example illustrated in FIG. 1 may allow standard-sized cans to fit on the provisioning cart 100 (e.g., at two twenty-four can packs on each of four shelves). In certain embodiments, the provisioning cart 100 may also include one or more canisters 116 positioned on a side of the provisioning cart 100.

Although FIG. 1 illustrates one example of a provisioning cart 100, various changes may be made to FIG. 1. For example, the provisioning cart 100 could include any number of each component in any suitable arrangement. In general, provisioning carts may come in a wide variety of configurations, and FIG. 1 does not limit the scope of this disclosure to any particular configuration. For example, the provisioning cart 100 may be a one-sided provisioning cart having at least one of a shelf, a container, or a drawer that is positioned on the one side of the provisioning cart 100 and is accessible on at least the one side of the provisioning cart 100. In certain embodiments, the provisioning cart 100 may be a provisioning cart with at least two or more sides. For example, the provisioning cart 100 may be a two-sided provisioning cart having at least one of a shelf, a container, or a drawer positioned on a first side of the two-sided provisioning cart and at least one of a shelf, a container, or a drawer positioned on a second side of the two-sided provisioning cart. At least one of the shelf, the container, or the drawer positioned on the first side of the two-sided provisioning cart may be accessible on at least the first side. Additionally, or alternatively, the shelf, the container, or the drawer positioned on the first side of the two-sided provisioning cart may be accessible on at least the second side. Similarly, at least one of the shelf, the container, or the drawer positioned on the second side of the two-sided provisioning cart may be accessible on at least the second side. Additionally, or alternatively, the shelf, the container, or the drawer positioned on the second side of the two-sided provisioning cart may be accessible on at least the first side.

Figure 2A:
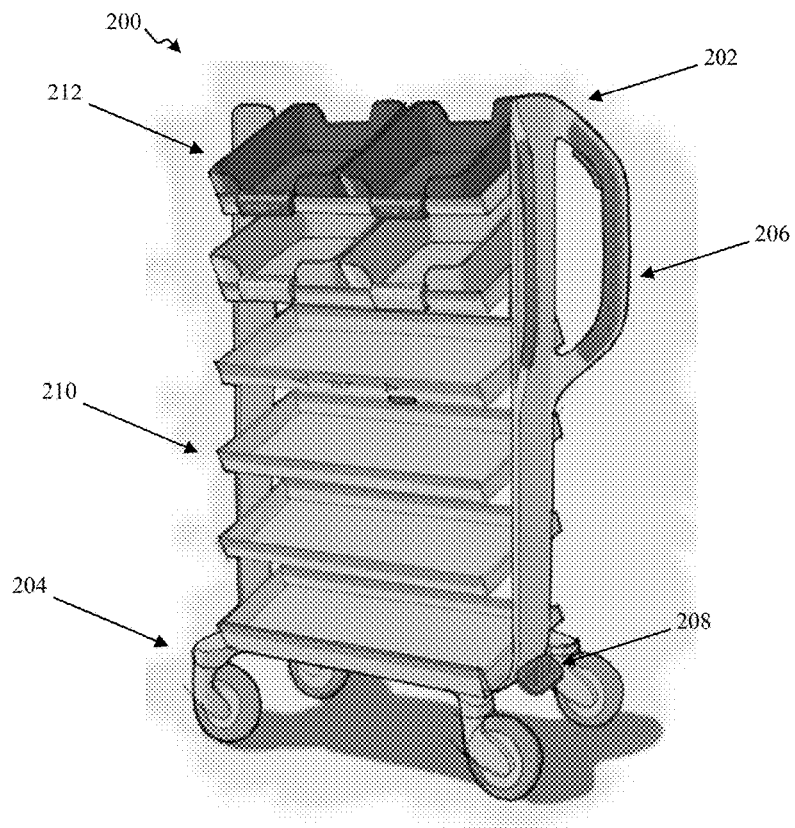
FIG. 2A illustrates a perspective view of another non-limiting, example provisioning cart according to certain embodiments of this disclosure.

FIG. 2A illustrates a perspective view of another non-limiting, example provisioning cart 200 according to certain embodiments of this disclosure. The embodiment of the provisioning cart 200 shown in FIG. 2A is for illustration only. Other embodiments of the provisioning cart 200 could be used without departing from the scope of this disclosure. For example, the provisioning cart 200 illustrated in FIG. 2A may include one or more same or similar features of the provisioning cart 100 illustrated in FIG. 1. Additionally, or alternatively, the provisioning cart 200 illustrated in FIG. 2A may include one or more same or similar features of any other provisioning cart or component described or illustrated herein.

Referring now to FIG. 2A, the provisioning cart 200 may have a frame 202, a plurality of wheels 204 attached to the frame 202 for providing the provisioning cart 200 with maneuverability, a handle 206 capable of being grabbed by a user for pushing and otherwise handling the provisioning cart 200, and brake 208 that when actuated is configured to lock at least one wheel of the plurality of wheels 204 preventing rotation and/or pivoting of the at least one wheel. The provisioning cart 200 may also have one or more shelves 210 that protrude a distance from the frame 202 of the provisioning cart 200. One or more bins 212 may be installed on one or more of the shelves 210 with each bin 212 including a recessed area for storing provisions. In certain embodiments, the shelves 210 may be angled down from the top of the frame 202. In certain embodiments, the one or more bins 212 may be tilt bins installed on one or more of the shelves 210. While the example provisioning cart 200 illustrated in FIG. 2A includes two bins 212 installed per shelf 210, the bins 212 may be larger (e.g., larger depth, larger width, larger height, larger volume, or the like) so that only one bin 212 can be installed per shelf 210 or may be smaller (e.g., smaller depth, smaller width, smaller height, smaller volume, or the like) so that more than two bins 212 can be installed per shelf 210. Additionally, or alternatively, the bins 212 may have different shapes (e.g., cylindrical, triangular, or the like) to accommodate provisions having particular sizes or shapes.

Although FIG. 2A illustrates one embodiment of a provisioning cart 200, various changes may be made to FIG. 2A. For example, the provisioning cart 200 could include any number of each component in any suitable arrangement. In general, provisioning carts may come in a wide variety of configurations, and FIG. 2A does not limit the scope of this disclosure to any particular configuration. For example, the provisioning cart 200 may be a one-sided provisioning cart having at least one of a shelf, a container, or a drawer that is positioned on the one side of the provisioning cart 200 and is accessible on at least the one side of the provisioning cart 200. In certain embodiments, the provisioning cart 200 may be a provisioning cart with at least two or more sides. For example, the provisioning cart 200 may be a two-sided provisioning cart having at least one of a shelf, a container, or a drawer positioned on a first side of the two-sided provisioning cart and at least one of a shelf, a container, or a drawer positioned on a second side of the two-sided provisioning cart. At least one of the shelf, the container, or the drawer positioned on the first side of the two-sided provisioning cart may be accessible on at least the first side. Additionally, or alternatively, the shelf, the container, or the drawer positioned on the first side of the two-sided provisioning cart may be accessible on at least the second side. Similarly, at least one of the shelf, the container, or the drawer positioned on the second side of the two-sided provisioning cart may be accessible on at least the second side. Additionally, or alternatively, the shelf, the container, or the drawer positioned on the second side of the two-sided provisioning cart may be accessible on at least the first side.

Figure 2B:
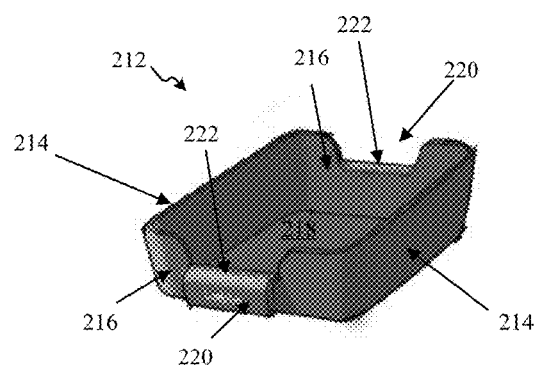
FIG. 2B illustrates a perspective view of a non-limiting, example tilt bin of the provisioning cart illustrated in FIG. 2A according to certain embodiments of this disclosure.

FIG. 2B illustrates a perspective view of a non-limiting, example bin 212 of the provisioning cart illustrated in FIG. 2A according to certain embodiments of this disclosure. The bin 212 may be configured for installation onto the provisioning cart 200 illustrated in FIG. 2A. The embodiment of the bin 212 shown in FIG. 2B is for illustration only. Other embodiments of the bin 212 could be used without departing from the scope of this disclosure. For example, the bin 212 illustrated in FIG. 2B may include one or more same or similar features of the bin 110 illustrated in FIG. 1. Additionally, or alternatively, the bin 212 illustrated in FIG. 2B may include one or more same or similar features of any other bin, provisioning cart, or component described or illustrated herein.

As illustrated in FIG. 2B, each bin 212 may have two side walls 214, two end walls 216, and a base or a floor 218. Each of the two end walls 216 may include an overhang or lip 220 extending out and down from the end walls 216. The lips 220 may be capable of fitting over a section of a shelf 210, such that the width of a front edge of the shelf 210 fits within an area between the lip 220 and the end walls 216. The configuration of the bin 212, the lip 220, and the shelves 210 may allow for the bins 212 to be securely installed, removed, subsequently securely installed again, and subsequently removed again on the shelves 210 of the provisioning cart 200 as needed. The bins 212 may also include grip areas 222 on each lip 220 to allow the bins 212 to be easily gripped and accessed.

Although FIG. 2B illustrates one embodiment of a bin 212, various changes may be made to FIG. 2B. For example, the bin 212 could include any number of each component in any suitable arrangement. In general, bins may come in a wide variety of configurations, and FIG. 2B does not limit the scope of this disclosure to any particular configuration.

Figure 3A:
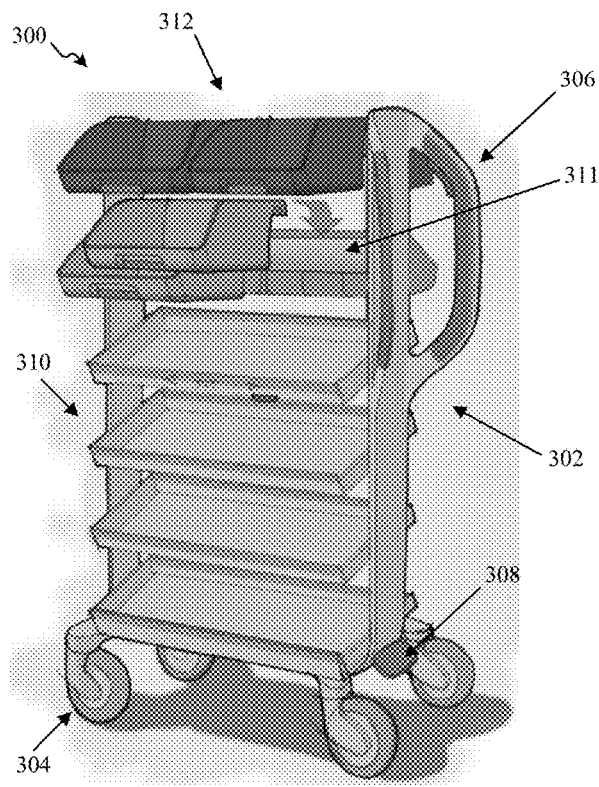
FIG. 3A illustrates a perspective view of another non-limiting, example provisioning cart according to certain embodiments of this disclosure.

FIG. 3A illustrates a perspective view of another non-limiting, example provisioning cart 300 according to certain embodiments of this disclosure. The embodiment of the provisioning cart 300 shown in FIG. 3A is for illustration only. Other embodiments of the provisioning cart 300 could be used without departing from the scope of this disclosure. For example, the provisioning cart 300 illustrated in FIG. 3A may include one or more same or similar features of the provisioning cart 100 illustrated in FIG. 1 or the provisional cart 200 illustrated in FIG. 2A. Additionally, or alternatively, the provisioning cart 300 illustrated in FIG. 3A may include one or more same or similar features of any other provisioning cart or component described or illustrated herein.

Referring now to FIG. 3A, the provisioning cart 300 may have a frame 302, a plurality of wheels 304 attached to the frame 302 for providing the provisioning cart 300 with maneuverability, a handle 306 capable of being grabbed by a user for pushing and otherwise handling the provisioning cart 300, and a brake 308 that when actuated is configured to lock at least one wheel of the plurality of wheels 304 preventing rotation and/or pivoting of the at least one wheel of the provisioning cart 300. The provisioning cart 300 may also have one or more shelves 310 that protrude a distance from the frame 302 of the provisioning cart 300. In certain embodiments, the shelves 310 may be angled down from the top of the frame 302.

In certain embodiments, the provisioning cart 300 may have one or more rails 311 connected between a left side of the frame 302 and a right side of the frame 302 of the provisioning cart 300. One or more bins 312 may be installed on at least one rail 311 of the one or more rails 311 with each bin 312 including a recessed area for storing provisions. While the example provisioning cart 300 illustrated in FIG. 3A includes two bins 312 installed per rail 311 per side of the provisioning cart 300, the bins 312 may be larger (e.g., larger depth, larger width, larger height, larger volume, or the like) so that only one bin 312 can be installed per rail 311 per side of the provisioning cart 300 or may be smaller (e.g., smaller depth, smaller width, smaller height, smaller volume, or the like) so that more than two bins 312 can be installed per rail 311 per side of the provisioning cart 300. Additionally, or alternatively, the bins 312 may have different shapes (e.g., cylindrical, triangular, or the like) to accommodate provisions having particular shapes.

Although FIG. 3A illustrates one embodiment of a provisioning cart 300, various changes may be made to FIG. 3A. For example, the provisioning cart 300 could include any number of each component in any suitable arrangement. In general, provisioning carts may come in a wide variety of configurations, and FIG. 3A does not limit the scope of this disclosure to any particular configuration. For example, the provisioning cart 300 may be a one-sided provisioning cart having at least one of a shelf, a container, or a drawer that is positioned on the one side of the provisioning cart 300 and is accessible on at least the one side of the provisioning cart 300. In certain embodiments, the provisioning cart 300 may be a provisioning cart with at least two or more sides. For example, the provisioning cart 300 may be a two-sided provisioning cart having at least one of a shelf, a container, or a drawer positioned on a first side of the two-sided provisioning cart and at least one of a shelf, a container, or a drawer positioned on a second side of the two-sided provisioning cart. At least one of the shelf, the container, or the drawer positioned on the first side of the two-sided provisioning cart may be accessible on at least the first side. Additionally, or alternatively, the shelf, the container, or the drawer positioned on the first side of the two-sided provisioning cart may be accessible on at least the second side. Similarly, at least one of the shelf, the container, or the drawer positioned on the second side of the two-sided provisioning cart may be accessible on at least the second side. Additionally, or alternatively, the shelf, the container, or the drawer positioned on the second side of the two-sided provisioning cart may be accessible on at least the first side.

Figure 3B:
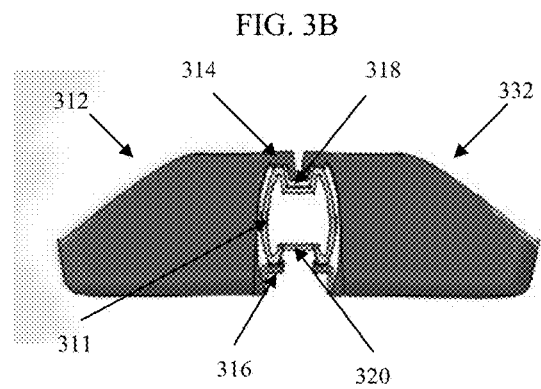
FIG. 3B illustrates a perspective view of a non-limiting, example bin and a non-limiting, example rail of the provisioning cart illustrated in FIG. 3A according to certain embodiments of this disclosure.

FIG. 3B illustrates a perspective view of a non-limiting, example bin 312 and a non-limiting, example rail 311 of the provisioning cart illustrated in FIG. 3A according to certain embodiments of this disclosure. The bin 312 may be configured for installation onto the provisioning cart 300 via the rail 311 illustrated in FIG. 3A. The embodiment of the bin 312 and the embodiment of the rail 311 shown in FIG. 3B is for illustration only. Other embodiments of the bin 312 and the rail 311 could be used without departing from the scope of this disclosure. For example, the bin 312 illustrated in FIG. 3B may include one or more same or similar features of the bin 110 illustrated in FIG. 1 or the bin 212 illustrated in FIGS. 2A and 2B. Additionally, or alternatively, the bin 312 illustrated in FIG. 3B may include one or more same or similar features of any other bin, provisioning cart, or component described or illustrated herein.

As shown in FIG. 3B, a bin 312 is attached to the rail 311 of the provisioning cart 300 illustrated in FIG. 3A. The bin 312 may have an upper overhang or an upper lip 314 extending out and hooking down from a backside and near a top portion of the bin 312. The bin 312 may also include a lower lip 316 extending out and hooking upward from the backside and near a bottom portion of the bin 312. The rail 311 may have an upper recess 318 positioned on a top surface of the rail 311 and a bottom recess 320 positioned on a bottom surface of the rail 311. The upper lip 314 may be capable of fitting and/or snapping over a top surface of the rail 311 and extending into the upper recess 318 to attached the bin 312 to the rail 311. Similarly, the lower lip 316 may be capable of fitting and/or snapping over a bottom surface of the rail 311 and extending into the lower recess 320 to attached the bin 312 to the rail 311. In certain embodiments, the upper lip 314 may snap over the top surface of the rail 311 and extend into the upper recess 318 and the lower lip 316 may snap over the bottom surface of the rail 311 and extend into the lower recess 320 at approximately the same time to secure the bin 312 to the rail 311. In this case, a width of the rail 311 may fit within an area partially surrounded by (e.g., between) the upper lip 314, the lower lip 316, and a back surface of the bin 312. The interacting components of the bin 312 and the rail 311 may allow for the bin 312 to be removed and installed on the rail 311 multiple times as needed without damaging the bin 312 or the rail 311.

In certain embodiments, each rail 311 of the provisioning cart 300 may be configured so a bin 312 may be secured to a rail 311 on only one side of the provisioning cart 300. For example, when the provisioning cart 300 is a one-sided provisioning cart, a bin 312 may be attached to only one side of the rail 311 on a side of the provisioning cart 300 that also provides access to one or more shelves, containers, or drawers. In certain embodiments, each rail 311 of the provisioning cart 300 may be configured so a bin 312 may be secured to a rail 311 on either a first side or a second side of the provisioning cart 300 that is opposite the first side. For example, when the provisioning cart 300 is a two-sided provisioning cart, a bin 312 may be attached to either a first side of a rail 311 on a first side of the provisioning cart 300 or a second side of the rail 311 that is opposite the first side of the rail 311 and is on a second side of the provisioning cart 300. Thus, a first bin 312 may be attached to a first side of the rail 311 so that the first bin 312 is accessible from a first side of the provisioning cart 300 and a second bin 312 may be attached to a second side of the same rail 311 so that the second bin 312 is accessible from a second side of the provisioning cart 300 opposite the first side.

As shown in FIG. 3B, a first bin 312 is attached to a first side of the rail 311 as described herein. Similarly, a second bin 332, that may include one or more same or similar features of the first bin 312, may be attached to a second side of the same rail 311 in a same or similarly manner as described with respect to the first bin 312. Accordingly, the rail 311 may securely hold a first bin 312 on a first side of the rail 311 so that the first bin 312 is accessible on a first side of a provisioning cart 300 and also securely hold a second bin 332 on a second side of the rail 311 so that the second bin 332 is accessible on a second side of the provisioning cart 300 opposite the first side of the provisioning cart 300.

Although FIG. 3B illustrates one embodiment of a bin 312, various changes may be made to FIG. 3B. For example, the bin 312 could include any number of each component in any suitable arrangement. In general, bins may come in a wide variety of configurations, and FIG. 3B does not limit the scope of this disclosure to any particular configuration.

Figure 4A:
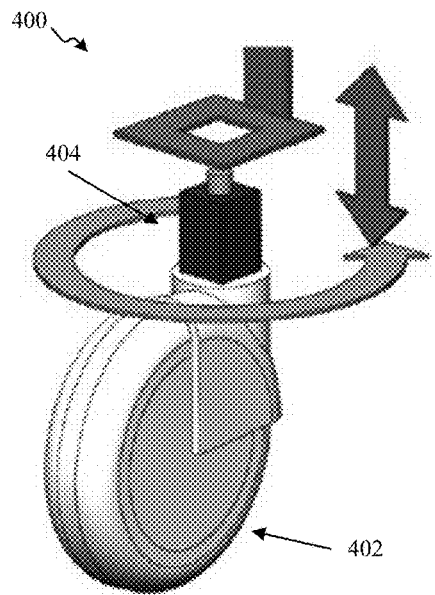
FIG. 4A illustrates a perspective view of a non-limiting, example selectable swivel wheel according to certain embodiments of this disclosure.

FIG. 4A illustrates a perspective view of a non-limiting, example selectable swivel wheel 400 according to certain embodiments of this disclosure. The embodiment of the selectable swivel wheel 400 shown in FIG. 4A is for illustration only. Other embodiments of the selectable swivel wheel 400 could be used without departing from the scope of this disclosure. For example, the selectable swivel wheel 400 illustrated in FIG. 4A may include one or more same or similar features of a wheel 104 illustrated in FIG. 1, a wheel 204 illustrated in FIG. 2A, or a wheel 304 illustrated in FIG. 3A. Additionally, or alternatively, the selectable swivel wheel 400 illustrated in FIG. 4A may include one or more same or similar features of any other wheel or mechanism to assist with movement of a provisioning cart described or illustrated herein. Additionally, or alternatively, the selectable swivel wheel 400 illustrated in FIG. 4A may include one or more same or similar features of any other wheel, provisioning cart, or component described or illustrated herein.

Referring now to FIG. 4A, the selectable swivel wheel 400 may have a wheel 402 and a provisioning cart attachment mechanism 404 for attaching the wheel 402 to a provisioning cart described herein. The wheel 402 may be configured to rotate 360° relative to the provisioning cart attachment mechanism 404 and the provision cart when the selectable swivel wheel 400 is attached to the provisioning cart. The provisioning cart attachment mechanism 404 may include a selectable mechanism such as a spring-loaded rectangular cam that can be used to lock the wheel 402 in a 0° or 180° rotation in forward motion. The selectable mechanism may be released to allow for the wheel 402 to swivel freely 360°. The selectable mechanism may lock and release the swivel rotation of the wheel 402 via a bicycle cable and spring system, for example.

In certain embodiments, the selected swivel wheel 400 may be attached to a provisioning cart and extend from the provisioning cart below a bottom surface of the provisioning cart to enable the provisioning cart to move or be moved across a surface (e.g., a floor). The selectable swivel wheel 400 may be attached to a provisioning cart with one or more other selectable swivel wheels 400 have one or more same or similar features described herein. For example, four selectable swivel wheels 400 may be attached to a provisioning cart with four corners on a bottom surface so that each of the four selectable swivel wheels 400 extend below the bottom surface near or at each of the four corners. In certain embodiments, a selectable swivel wheel 400 may be attached to a bottom surface of a provisioning cart. Additionally, or alternatively, a selectable swivel wheel 400 may be attached to a side surface of a provisioning cart and extend beyond a bottom surface of the provisioning cart.

Although FIG. 4A illustrates one embodiment of a selected swivel wheel 400, various changes may be made to FIG. 4A. For example, the selected swivel wheel 400 could include any number of each component in any suitable arrangement. In general, selectable swivel wheel 400 may come in a wide variety of configurations, and FIG. 4A does not limit the scope of this disclosure to any particular configuration.

Figure 4B:
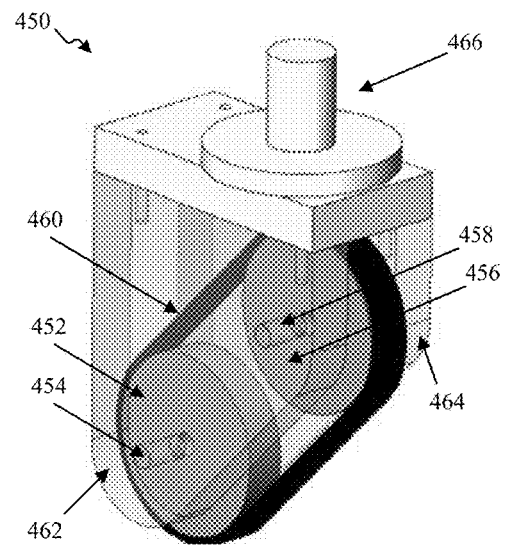
FIG. 4B illustrates a perspective view of a non-limiting, example tank tread apparatus according to certain embodiments of this disclosure.

FIG. 4B illustrates a perspective view of a non-limiting, example tank tread apparatus 450 according to certain embodiments of this disclosure. The embodiment of the tank tread apparatus 450 shown in FIG. 4B is for illustration only. Other embodiments of the tank tread apparatus 450 could be used without departing from the scope of this disclosure. For example, the tank tread apparatus 450 illustrated in FIG. 4B may include one or more same or similar features of any other component described or illustrated herein.

As illustrated in FIG. 4B, the tank tread apparatus 450 may include at least a first wheel 452 having a shaft 454 running therethrough. The tank tread apparatus 450 may also include a second wheel 456 having a shaft 458 running therethrough. As shown in FIG. 4B, the first wheel 452 and the second wheel 456 may be positioned diagonal configuration with respect to each other. A belt or tread 460 may be disposed around both the first wheel 452 and the second wheel 456 so that the tread 460 is disposed at an angle from a bottom surface of the provisioning cart. In some embodiments, the tank tread apparatus 450 may include a first protective side 462 and a second protective side 464. The first protective side 462 and the second protective side 464 may at least partially surround the first wheel 452 and the second wheel 546. The first protective side 462 and the second protective side 464 may allow the first shaft 454 and the second shaft 458 to maintain the positions of the first wheel 452 and the second wheel 546, respectively, relative to each other and the tank tread apparatus 450. The first protective side 462 and the second protective side 464 may also maintain the tread 460 in an exposed position. In certain embodiments, the tank tread apparatus 450 may include an attachment mechanism 466 configured to secure the tank tread apparatus 450 to a provisioning cart. The tank tread apparatus 450 may be attached to the provisioning cart on a bottom surface of the provisioning cart or on a side surface of the provisioning cart so that the tank tread apparatus 450 extends away from the body of the provisioning cart and beyond the bottom surface of the provisioning cart.

The tank tread apparatus 450 may be a component of a provisioning cart and be used during restocking operations of a transport vehicle, such as an aircraft, when there is a discrepancy in height between a platform used to access the transport vehicle and an entrance to the transport vehicle itself. The tank tread apparatus 450 may be centered at or near a bottom surface of a provisioning cart, for example, in between front wheels of a provisioning cart or in between back wheels of a provisioning cart as described and illustrated herein. In certain embodiments, the tank tread apparatus 450 may extend a distance from the provisioning cart below a bottom surface of the provisioning cart that is less than a distance that one or more wheels of the provisioning cart extend below the bottom surface of the provisioning cart. This configuration may prevent the tank tread apparatus 450 from impeding the one or more wheels from operation and restrict mobility of the provisioning cart. Additionally, or alternatively, the tank tread apparatus 450 may extend a distance from a provisioning cart beyond a side surface of the provisioning cart that is great than a distance that one or more wheels of the provisioning cart extend beyond the side surface. This configuration may permit the tank tread apparatus 450 to engage a step or a ledge before a body of the provisioning cart or the one or more wheels of the provisioning cart engage the step or the ledge.

During transfer of a provisioning cart between a platform and an entrance to the transport vehicle, the tread 460 of the tank tread apparatus 450 may engage or contact a front edge of the platform as a front of the provisioning cart is titled down from the platform in order for front wheels of the provisioning cart to reach the entrance to the transport vehicle. The tank tread apparatus 450 may allow for easier navigation of the height discrepancy between the platform and the entrance to the transport vehicle, provide a steady roll between the platform and the entrance to the transport vehicle rather than an abrupt bump or drag, protect the transport vehicle and the provisioning cart from collision with the other.

Although FIG. 4B illustrates one example of a tank tread apparatus 450, various changes may be made to FIG. 4B. In general, tank tread apparatuses 450 may come in a wide variety of configurations, and FIG. 4A does not limit the scope of this disclosure to any particular configuration.

Figure 5:
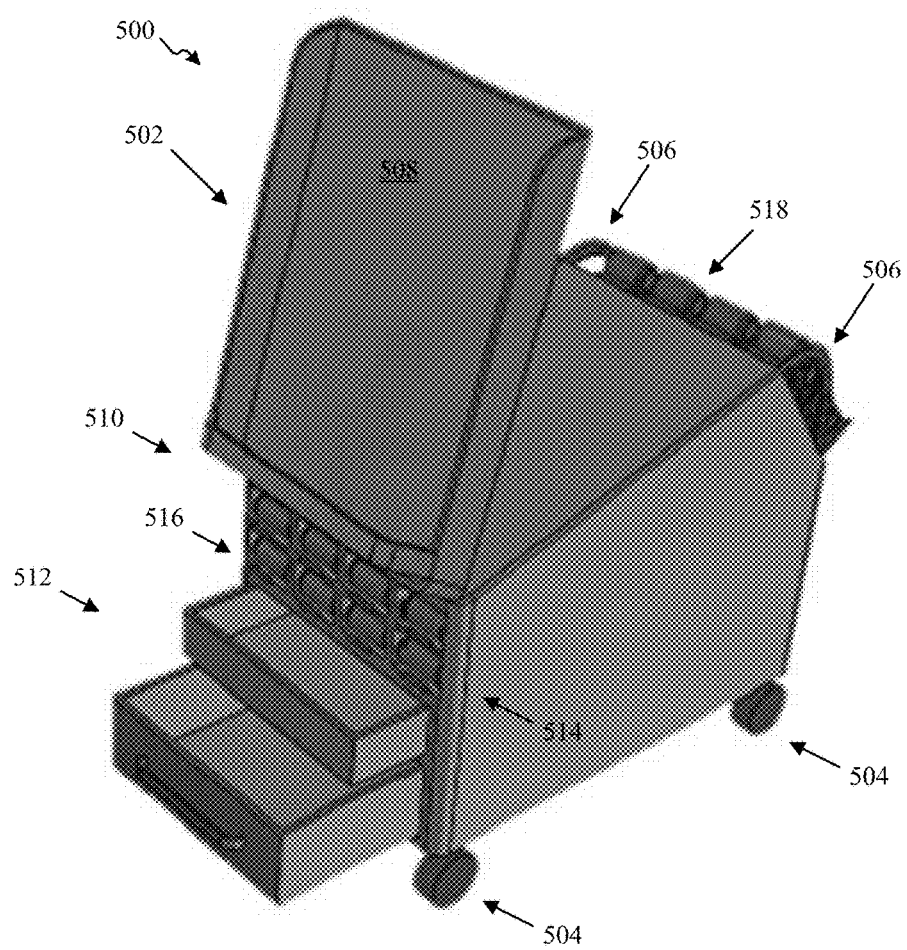
FIG. 5 illustrates a perspective of another non-limiting, example provisioning cart according to certain embodiments of this disclosure.

FIG. 5 illustrates a perspective of another non-limiting, example provisioning cart 500 according to certain embodiments of this disclosure. The embodiment of the provisioning cart 500 shown in FIG. 5 is for illustration only. Other embodiments of the provisioning cart 500 could be used without departing from the scope of this disclosure. For example, the provisioning cart 500 illustrated in FIG. 5 may include one or more same or similar features of the provisioning cart 100 illustrated in FIG. 1, the provisional cart 200 illustrated in FIG. 2A, or the provisioning cart 300 illustrated in FIG. 3A. Additionally, or alternatively, the provisioning cart 500 illustrated in FIG. 5 may include one or more same or similar features of any other provisioning cart or component described or illustrated herein.

As shown in FIG. 5, the provisioning cart 500 may have a frame or body 502, a plurality of wheels 504 attached to the body 502 for providing the provisioning cart 500 with maneuverability, one or more handles 506 capable of being grabbed by a user for pushing and otherwise handling the provisioning cart 500, and a door 508 configured to move between an open position providing access to a cavity 510 within body 502 of the provisioning cart 500 and a closed position preventing access to the cavity 510 within the body 502 of the provisioning cart 500. The door 508 may pivot (e.g., using one or more hinges) on a portion of an exterior surface of the provisioning cart 500 to move between the open position and closes position.

In some embodiments, the provisioning cart 500 may include one or more drawers 512. The one or more drawers 512 may reside within the cavity 510 of the provisioning cart 500. The one or more drawers 512 may be accessible through an opening 514 in a side surface of the provisioning cart 500 when the door 508 is not in the closed position (e.g., when the door is in the open position, when the door is in a partially open position). The opening 514 may be configured (e.g., sized, shaped) to allow the one or more drawers 512 to extend a distance out from the cavity 510, through the opening 514, and out of the body 502 of the provisioning cart 500 for access to provisions stored therein. In certain embodiments, the provisioning cart 500 may include two drawers 512. In other embodiments, the provisioning cart 500 may include one drawer 512 or a quantity of drawers 512 that is greater than two.

The provisioning cart 500 may also include one or more hoppers 516 disposed within the cavity 510. The one or more hoppers 516 may be accessible from an exterior of the body 502 via the opening 514 when the door 508 is not in the closed position (e.g., when the door is in the open position, when the door is in a partially open position). Each of the one or more hoppers 516 may have a hollow space that extends through at least a portion of the cavity 510. For example, the hollow space may extend from the opening 514 and through at least a portion of the cavity 510 to allow the hopper 516 to receive and retain multiple provisions at the same time. Each of the one or more hoppers 516 may include a cross-sectional area to receive and retain a provision. For example, the hollow space may have a cross-sectional area with a size and shape (e.g., a rectangular shape) to receive and retain a drink can or bottle laid sideways therein.

Continuing with FIG. 5, the provisioning cart 500 may include a quantity of eight hoppers 516. In some embodiments, the provision cart 500 may include a quantity of hoppers 516 that is more or less than eight depending, for example, on the size and shape of the provisions that are to be received and retained by the hopper 516 or the size and shape of the cavity 510. Additionally, or alternatively, the provisioning cart may include a back tray 518 disposed on a back surface of the provisioning cart 500 for receiving and retaining provisions.

In certain embodiments, the provisioning cart 500 may include one or more sensors. As described further herein, at least one sensor of the one or more sensors may be configured to detect when a provision is received by a particular receptacle (e.g., a hopper 516, a drawer 512, a back tray 518) or when a provision is removed from a particular receptacle. In certain embodiments, at least one sensor of the one or more sensors may also be configured to detect a quantity of provisions stored within one or more particular receptacles. In certain embodiments, one or more sensors may detect whether the door 508 is in the open position, the closed position, or a partially open position.

The one or more sensors may include at least one of a motion sensor, a contact sensor, a scale, or the like. For example, a motion sensor may be used to detect the motion of a provision when the provision is received by a particular receptacle, when the provision is removed from a particular receptacle, or the like. As another example, one or more contact sensors may be positioned at one or more different locations within or on the provisioning cart 500 (e.g., along a length of the hollow space of a hopper 516, one or more locations on the back tray 518) where a provision may contact the contact sensor. A combination of one or more contact sensors may be used to detect when a provision is received by a particular receptacle, when a provision is removed from a particular receptacle, a quantity of provisions retained by a particular one or more receptacles, or the like. As yet another example, one or more scales may be positioned at one or more different locations within or on the provisioning cart 500 (e.g., along a length of the hollow space of a hopper 516, on a floor of a drawer 512) where a weight of one or more provision can be determined. A combination of one or more scales may be used to detect when a provision is received by one or more particular receptacles, when a provision is removed from one or more particular receptacles, a quantity of provisions retained by one or more particular receptacles or the like.

As described herein, the door 508 may pivot (e.g., using one or more hinges) on a portion of an exterior surface of the provisioning cart 500 to move between the open position and closes position. In certain embodiments, as shown in FIG. 5, the opening 514 may be located on a side surface of the provisioning cart 500 and the door 508 may pivot upwards on a surface of the provisioning cart 500 so that when the door 508 is in the open position, the door 508 forms an canopy or cover to access provisions through the opening 514 in the cavity 510. This configuration may shield a person from environmental elements (e.g., hot sun, rain, snow, or the like) while the door 508 is in the open position and when transporting provisions from the provisioning cart 500 and through an entrance of a transport vehicle. In addition, this configuration may accommodate narrow widths of an entrance to a transport vehicle. Because the door 508 may pivot upwards, the provisioning cart 500 may be positioned as close as possible to the entrance of the transport vehicle when the door 508 is actuated from the closed position to the open position without having to allow for width clearance that would be need if the door pivoted left or right.

Although FIG. 5 illustrates one embodiment of a provisioning cart 500, various changes may be made to FIG. 5. For example, the provisioning cart 500 could include any number of each component in any suitable arrangement. In general, provisioning carts may come in a wide variety of configurations, and FIG. 5 does not limit the scope of this disclosure to any particular configuration. It should also be understood that while the door 508 of the provisioning cart 500 illustrated in FIG. 5 is in an open position or at least a partially open position, the door 508 may be actuated to the closed positioned or to a position that is closer to the closed position.

Figure 6:
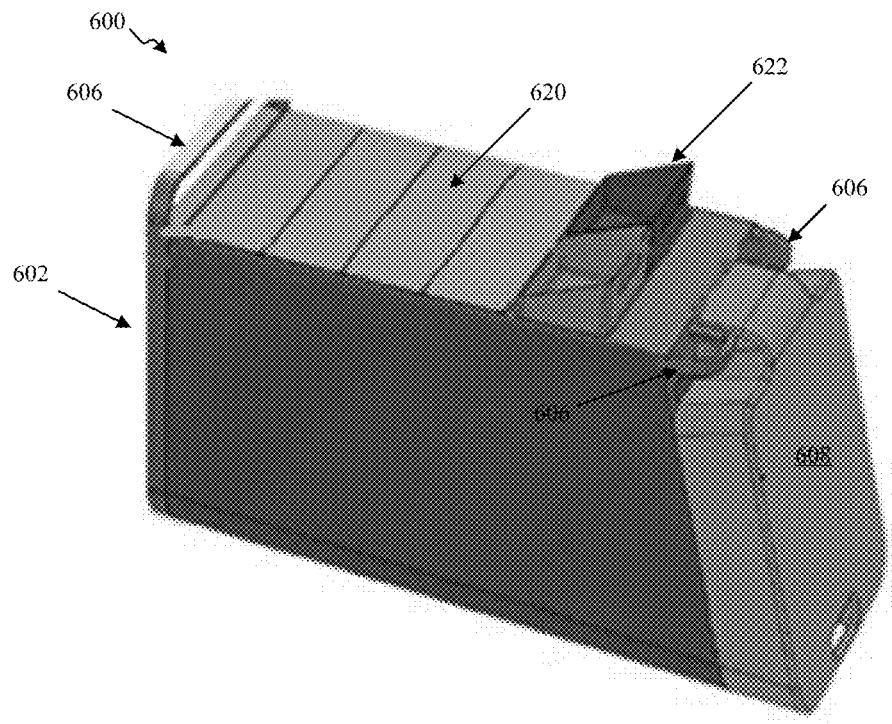
FIG. 6 illustrates a perspective view of another non-limiting, example provisioning cart according to certain embodiments of this disclosure.

FIG. 6 illustrates a perspective view of another non-limiting, example provisioning cart 600 according to certain embodiments of this disclosure. The embodiment of the provisioning cart 600 shown in FIG. 6 is for illustration only. Other embodiments of the provisioning cart 600 could be used without departing from the scope of this disclosure. For example, the provisioning cart 600 illustrated in FIG. 6 may include one or more same or similar features of the provisioning cart 100 illustrated in FIG. 1, the provisional cart 200 illustrated in FIG. 2A, the provisioning cart 300 illustrated in FIG. 3A, or the provisioning cart 500 illustrated in FIG. 5. Additionally, or alternatively, the provisioning cart 600 illustrated in FIG. 6 may include one or more same or similar features of any other provisioning cart or component described or illustrated herein.

As shown in FIG. 6, the provisioning cart 600 may have a frame or body 602, one or more handles 606 capable of being grabbed by a user for pushing and otherwise handling the provisioning cart 600, and a door 608 configured to move between an open position providing access to a cavity within body 602 of the provisioning cart 600 and a closed position preventing access to the cavity within the body 602 of the provisioning cart 600. The door 608 may pivot (e.g., using one or more hinges) on a portion of an exterior surface of the provisioning cart 500 to move between the open position and closes position. The body 602, the one or more handles 606, and the door 608 may be include one or more same or similar features of the body 502, the one or more handles 506, and the door 508 of the provisioning cart 500 illustrated in FIG. 5. As shown in FIG. 6, the door 608 is in the closed positioned described herein.

The provisioning cart 600 may also include one or more features that are at least similar to one or more others features of the provisioning cart 500 illustrated in FIG. 5. For example, the provisioning cart 600 may include a plurality of wheels attached to the body 602 for providing the provisioning cart 600 with maneuverability, a cavity within the body 602 of the provisioning cart 600, an opening providing access from an exterior position of the provisioning cart 600 to the cavity, one or more drawers, one or more hoppers, a back tray, one or more sensors, or the like.

At least similar to the provisioning cart 500 illustrated in FIG. 5 and as described herein, the provisioning cart 600 may include one or more hoppers disposed in the cavity within the body 602. The one or more hoppers may be accessible from an exterior of the body 602 via an opening when covered by the door 608 when the door 608 is in the closed position. Each of the one or more hoppers may have a hollow space that extends through at least a portion of the cavity. For example, the hollow space may extend from the opening covered by the door 608 and through at least a portion of the cavity to allow the hopper to receive and retain multiple provisions at the same time. Each of the one or more hoppers may include a cross-sectional area to receive and retain a provision. For example, the hollow space may have a cross-sectional area with a size and shape (e.g., a rectangular shape) to receive and retain a drink can or bottle laid sideways therein.

In certain embodiments, the one or more hoppers may have a hollow space that extends through the entire cavity or from a first exterior surface of the body 602, through the cavity within the body 602, and to a second exterior surface of the body 602. As shown in FIG. 6, the provisioning cart 600 includes the door 608 positioned on a first exterior surface of the body 602 and another door 620 positioned on a second exterior surface of the body 602. At least similar to the door 608, the other door 620 may be configured to move between an open position providing access to a cavity within body 602 of the provisioning cart 600 and a closed position preventing access to the cavity within the body 602 of the provisioning cart 600. When the other door 620 is in the closed position, as shown in FIG. 6, the other door 620 may cover another opening through the body 602 and prevent access to the hollow space of the one or more hoppers within the cavity. In certain embodiments, the provisioning cart 600 may also include one or more trays 622 positioned on a top surface of the body 602 of the provisioning cart 600 to hold and retain one or more provisions.

Although FIG. 6 illustrates one embodiment of a provisioning cart 600, various changes may be made to FIG. 6. For example, the provisioning cart 600 could include any number of each component in any suitable arrangement. In general, provisioning carts may come in a wide variety of configurations, and FIG. 6 does not limit the scope of this disclosure to any particular configuration.

Figure 7:
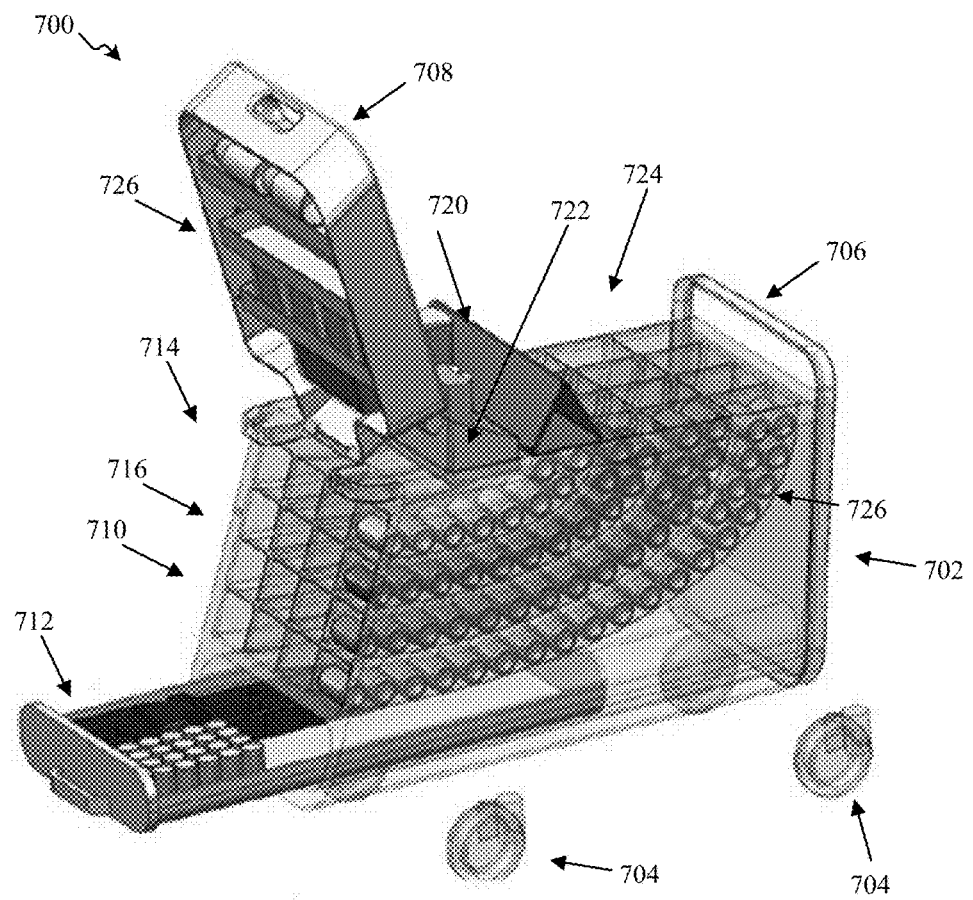
FIG. 7 illustrates an exploded view of the non-limiting, example provisioning cart according to certain embodiments of this disclosure.

FIG. 7 illustrates an exploded view of the non-limiting, example provisioning cart 700 according to certain embodiments of this disclosure. The embodiment of the provisioning cart 700 shown in FIG. 7 is for illustration only. Other embodiments of the provisioning cart 700 could be used without departing from the scope of this disclosure. For example, the provisioning cart 700 illustrated in FIG. 7 may include one or more same or similar features of the provisioning cart 100 illustrated in FIG. 1, the provisional cart 200 illustrated in FIG. 2A, the provisioning cart 300 illustrated in FIG. 3A, the provisioning cart 500 illustrated in FIG. 5, or the provisioning cart 600 illustrated in FIG. 6. Additionally, or alternatively, the provisioning cart 700 illustrated in FIG. 7 may include one or more same or similar features of any other provisioning cart or component described or illustrated herein.

As shown in FIG. 7, the provisioning cart 700 may have a frame or body 702, a plurality of wheels 704 attached to the body 702 for providing the provisioning cart 700 with maneuverability, one or more handles 706 capable of being grabbed by a user for pushing and otherwise handling the provisioning cart 700, and a first door 708 configured to move between an open position providing access to a cavity 710 within body 702 of the provisioning cart 700 through a first opening 714 and a closed position preventing access to the cavity 710 within the body 702 of the provisioning cart 700 through the first opening 714. The first door 708 may pivot (e.g., using one or more hinges) on a portion of an exterior surface of the provisioning cart 700 to move between the open position and closed position. At similar to the first door 708, the provisioning cart 700 may also include a second door 720. The second door 720 may be configured to move between an open position providing access to the cavity 710 within body 702 of the provisioning cart 700 through a second opening 724 and a closed position preventing access to the cavity 710 within the body 702 of the provisioning cart 700 through the second opening 724. In certain embodiments, the second door 720 may slide across a surface of the provisioning cart 700 to transition between the open position and the closed position.

In some embodiments, the provisioning cart 700 may include one or more drawers 712. The one or more drawers 712 may reside within the cavity 710 of the provisioning cart 700. The one or more drawers 712 may be accessible through the first opening 714 in a side surface of the provisioning cart 700 when the first door 708 is not in the closed position (e.g., when the door is in the open position, when the door is in a partially open position). The first opening 714 may be configured (e.g., sized, shaped) to allow the one or more drawers 712 to extend a distance out from the cavity 710, through the first opening 714, and out of the body 702 of the provisioning cart 700 for access to provisions stored therein. In certain embodiments, the provisioning cart 700 may include a single drawer 712. In other embodiments, the provisioning cart 700 may include two or more drawers 712.

The provisioning cart 700 may also include one or more hoppers 716 disposed within the cavity 710. The one or more hoppers 716 may be accessible from an exterior of the body 702 via the first opening 714 when the first door 708 is not in the closed position (e.g., when the first door 708 is in the open position, when the first door 708 is in a partially open position). In certain embodiments, the one or more hoppers 716 may also be accessible from the exterior of the body 702 via the second opening 724 when the second door 720 is not in the closed positioned as shown in FIG. 7. In certain embodiments, each of the one or more hoppers 716 may receive provisions through the second opening 724 and provide provisions through the first opening 714 so that a flow of provisions through each of the hoppers 716 is unidirectional. Each of the one or more hoppers 716 may have a hollow space that extends through at least a portion of the cavity 710. For example, the hollow space may extend from the first opening 714 through at least a portion of the cavity 710 to allow the hoppers 716 to receive and retain multiple provisions at the same time. As another example, the hollow space may extend from the second opening 724 through at least a portion of the cavity 710 to allow the hoppers 716 to receive and retain multiple provisions at the same time. Each of the one or more hoppers 716 may include a cross-sectional area to receive and retain a provision. For example, the hollow space may have a cross-sectional area with a size and shape (e.g., a rectangular shape) to receive and retain a drink can or bottle laid sideways therein.

As shown in FIG. 7, each of the hollow spaces of the respective hoppers 716 may extend between the first opening 714 and the second opening 724. Generally, the second opening 724 may have a higher elevation than the first opening so that when a provision is placed within a hopper 716, gravity may draw the provision from the second opening 724 toward the first opening 714. For example, as shown in FIG. 7, the second opening 724 is on a top surface of the provisioning cart 700 and the first opening 714 is on a side surface of the provisioning cart 700 so that when a provision is placed in a hopper 716 through the second opening 724, the provision may fall towards the first opening 714. In certain embodiments, the second opening 724 may be positioned on a side surface that is opposite the provisioning cart 700 from the first opening 714.

At least one surface (e.g., a bottom surface) forming each of the hollow spaces may have a curvature that extends from at least one of the first opening 714 or the second opening 724 and through at least a portion of a length of the hollow space. In certain embodiments, the curvature of the at least one surface may extend from at least one of the first opening 714 or the second opening 724 and through only a portion or a fraction of the length of the hollow space. In this embodiment, the surface having the curvature may also include a flat portion that extends another portion or fraction of the length of the hollow space (e.g., a remaining portion of the length of the hollow space, a length between two sections of curvature on the surface). The curvature may turn the at least one surface less than 90 degrees, more than 90 degrees, or 90 degrees. In certain embodiments, the curvature may be varying or changing as similarly described herein.

In certain embodiments, the curvature of the at least one surface may extend an entire length of the hollow space (e.g., from the second opening 724 to the first opening 714). For example, the curvature of the at least one surface may turn 90 degrees as the at least one surface curves from the second opening 724 to the first opening 714. As another example, the curvature of the at least one surface may turn more than 90 degrees as the at least one surface curves from the second opening 724 to the first opening 714 so that provisions may not fall out of the respective hoppers 716 through the first opening 714 when the first door 708 is opened. As yet another example, the curvature of the at least one surface may turn less than 90 degrees as the at least one surface curves from the second opening 724 to the first opening 714 so that provisions may reach the first opening 714 after the provisions are placed into the respective hopper 716 through the second opening 724.

In certain embodiments, the curvature of the at least one surface may be a varying or changing so that a degree of curvature changes along the length of the hollow space. For example, the degree of curvature along the length of the hollow space that originates at the second opening 724 may be greater than the degree of curvature along another portion of the length of the hollow space (e.g., along a length of the hollow space that extends to the first opening 714).

Continuing with FIG. 7, the provisioning cart 700 may include a quantity of sixteen hoppers 716. In some embodiments, the provision cart 700 may include a quantity of hoppers 716 that is more or less than sixteen depending, for example, on the size and shape of the provisions that are to be received and retained by the hoppers 716 or the size and shape of the cavity 710. Additionally, or alternatively, the provisioning cart may include a tray 722 disposed on a top surface of the provisioning cart 700 for receiving and retaining provisions.

In certain embodiments, the provisioning cart 700 may include one or more sensors. As described further herein, at least one sensor of the one or more sensors may be configured to detect when a provision is received by a particular receptacle (e.g., a hopper 716, a drawer 712, a tray 722) or when a provision is removed from a particular receptacle. In certain embodiments, at least one sensor of the one or more sensors may also be configured to detect a quantity of provisions stored within one or more particular receptacles. In certain embodiments, one or more sensors may detect whether the first door 708 or the second door 720 is in the open position, the closed position, or a partially open position.

The one or more sensors may include at least one of a motion sensor, a contact sensor, a scale, or the like. For example, a motion sensor may be used to detect the motion of a provision when the provision is received by a particular receptacle, when the provision is removed from a particular receptacle, or the like. As another example, one or more contact sensors may be positioned at one or more different locations within or on the provisioning cart 700 (e.g., along a length of the hollow space of a hopper 716, one or more locations on the tray 722) where a provision may contact the contact sensor. A combination of one or more contact sensors may be used to detect when a provision is received by a particular receptacle, when a provision is removed from a particular receptacle, a quantity of provisions retained by a particular one or more receptacles, or the like. As yet another example, one or more scales may be positioned at one or more different locations within or on the provisioning cart 700 (e.g., along a length of the hollow space of a hopper 716, on a floor of a drawer 712) where a weight of one or more provision can be determined. A combination of one or more scales may be used to detect when a provision is received by one or more particular receptacles, when a provision is removed from one or more particular receptacles, a quantity of provisions retained by one or more particular receptacles or the like.

As described herein, the first door 708 may pivot (e.g., using one or more hinges) on a portion of an exterior surface of the provisioning cart 700 to move between the open position and closes position. In certain embodiments, as shown in FIG. 7, the first opening 714 may be located on a side surface of the provisioning cart 700 and the first door 708 may pivot upwards on a surface of the provisioning cart 700 so that when the first door 708 is in the open position, the first door 708 forms a canopy or cover while providing access to provisions through the first opening 714 in the cavity 710. In certain embodiments, the first door 708 may include one or more shelves 726 positioned on an under-side of the first door 708 so that when the first door 708 is open, provisions stored on the one or more shelves 726 may be access. This configuration may shield a person from environmental elements (e.g., hot sun, rain, snow, or the like) while the first door 708 is in the open position and when transporting provisions from the provisioning cart 700 and through an entrance of a transport vehicle. In addition, this configuration may accommodate narrow widths of an entrance to a transport vehicle. Because the first door 708 may pivot upwards, the provisioning cart 700 may be positioned as close as possible to the entrance of the transport vehicle when the first door 708 is actuated from the closed position to the open position without having to allow for width clearance that would be need if the door pivoted left or right.

Although FIG. 7 illustrates one embodiment of a provisioning cart 700, various changes may be made to FIG. 7. For example, the provisioning cart 700 could include any number of each component in any suitable arrangement. In general, provisioning carts may come in a wide variety of configurations, and FIG. 7 does not limit the scope of this disclosure to any particular configuration. It should also be understood that while the first door 708 and the second door 720 of the provisioning cart 700 illustrated in FIG. 7 are in open positions or at least partially open positions, the first door 708 and the second door 720 may be actuated to closed positions or to positions that are closer to closed positions.

FIGS. 8A, 8B, 8C, and 8D illustrate several views of embodiments of the provisioning cart 700 illustrated in FIG. 7 according to this disclosure. The embodiments of the provisioning cart 700 shown in FIGS. 8A, 8B, 8C, and 8D are for illustration only. Other embodiments of the provisioning cart 700 could be used without departing from the scope of this disclosure.

Figure 8A:
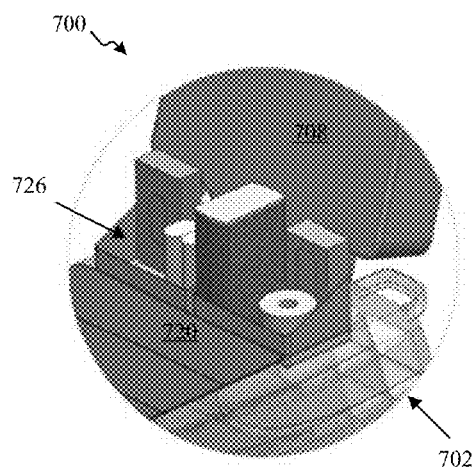
FIGS. 8A, 8B, 8C, and 8D illustrate several views of non-limiting, example embodiments of the provisioning cart illustrated in FIG. 7 according to certain embodiments of this disclosure.
Figure 8B:
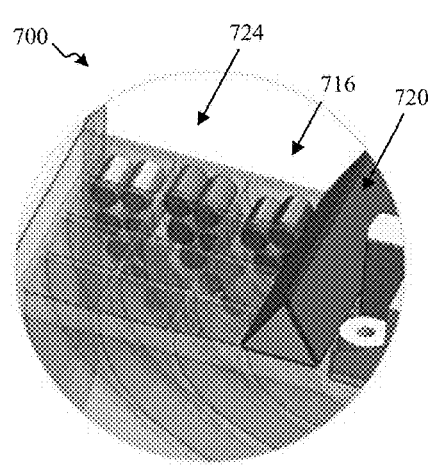
Figure 8C:
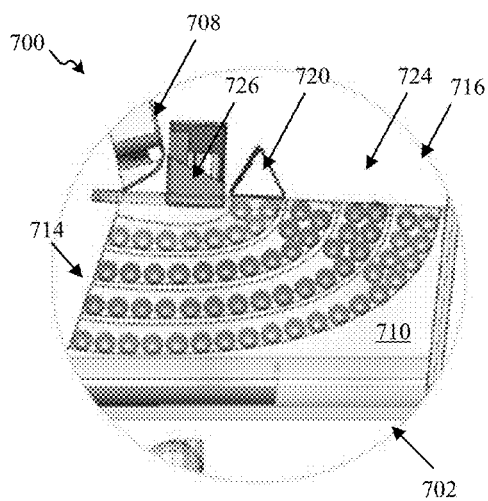
Figure 8D:
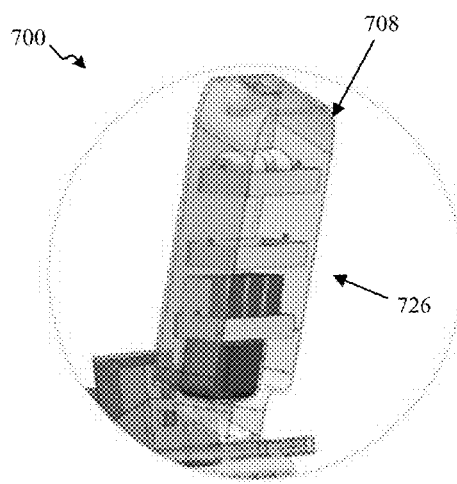

FIG. 8A illustrates a perspective view of the provisioning cart 700 including the tray 722, the first door 708, and the second door 720. As shown in FIG. 8A, the tray 722 is retaining one or more provisions. FIG. 8B illustrates a top view of the provisioning cart 700 including the second opening 724, the one or more hoppers 716, and the second door 720. As shown in FIG. 8B, the second door 720 is in the open position and one or more of the hoppers 716 are retaining one or more provisions. FIG. 8C illustrates a cross-sectional view of the provisioning cart 700 including the first opening 714, the first door 708, the body 702, the cavity 710, the tray 722, the second door 720, the second opening 724, and the one or more hoppers 716. As shown in FIG. 8C, each of the one or more hoppers 716 has at least one curved surface that forms a hollow space and that extends from at least one of the first opening 714 or the second opening 724 and through a least a portion of the length of the hollow space. FIG. 8D illustrates a perspective view of the provisioning cart 700 including the first door 708 and the one or more shelves 726. As shown in FIG. 8D, the first door 708 is in an open position providing access to the one or more shelves 726.

Although FIGS. 8A, 8B, 8C, and 8D illustrate example embodiments of the provisioning cart 700 illustrated in FIG. 7, various changes may be made to FIGS. 8A, 8B, 8C, and 8D. For example, the provisioning cart 700 could include any number of each component in any suitable arrangement. In general, provisioning carts may come in a wide variety of configurations, and FIGS. 8A, 8B, 8C, and 8D do not limit the scope of this disclosure to any particular configuration.

Figure 9:
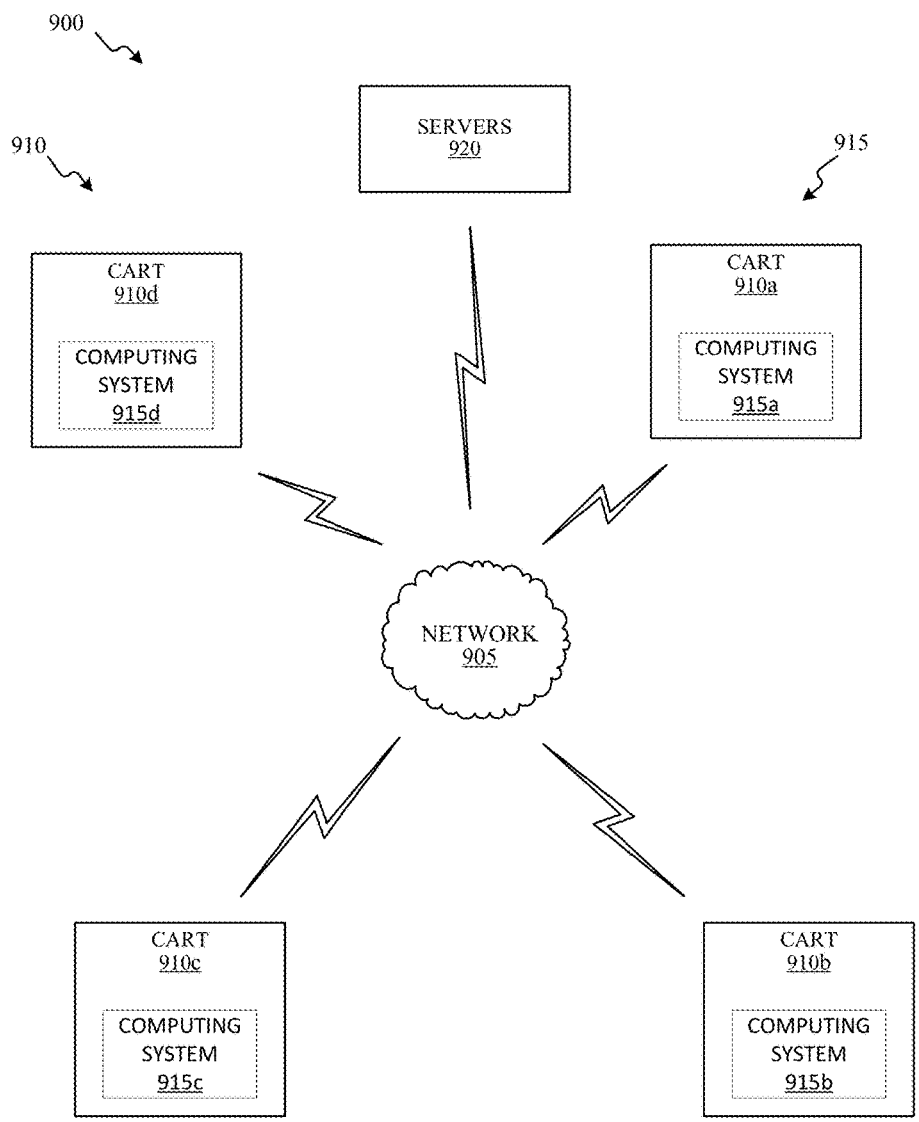
FIG. 9 illustrates a non-limiting, example network context for operating a provisioning cart according to certain embodiments of this disclosure.

FIG. 9 illustrates a non-limiting, example network context 900 for operating one or more provisioning carts 910 according to certain embodiments of this disclosure. One or more components of the network context 900 may operate as separate components linked by one or more constituent networks of the network 905. In some embodiments, one or more constituent networks of the network 905 may include the internet, which can be accessed over both wired connections (e.g., an Ethernet connection) or over a wireless connection (e.g., a wireless local area network "WLAN" connection, a cellular network connection). Additionally, or alternatively, one or more constituent networks of the network 905 may include a combination of private networks (e.g., a local wireless mesh network) and public networks (e.g., a telephone (POTS) network). In certain embodiments, one or more constituent networks of the network 905 may support multiple communication protocols, including both wireless protocols (e.g., BLUETOOTH™, circuit-switched cellular, 3G, LTE, WiBro) and internet protocols (e.g., HTTP).

The one or more constituent networks of the network 905 provide two-way electronic connectivity and electronic communication between each of the one or more provisioning carts 910 and the one or more servers 920. In certain embodiments, the one or more constituent networks of the network 905 provide two-way electronic connectivity and electronic communication between each of the one or more provisioning carts 910 and the one or more servers 920 using one or more same or different channels, protocols, or networks of network 905. For example, a circuit-switched cellular protocol wireless network of the network 905 provides electronic connectivity and electronic communication between the first provisioning cart 910a and the one or more servers 920 while a POTS wireless network of the network 905 provides electronic connectivity and electronic communication between the third provisioning cart 910c and the one or more servers 920.

In certain embodiments, the network context 900 may, according to certain embodiments, include one or more servers 920. In certain embodiments, the one or more servers 920 receive and store information associated with each of the one or more provisioning carts 910. For example, the server 920 may store provision identification information for one or more different provisions stored in each of the one or more provisioning carts 910, quantity information related to one or more different provisions stored in each of the one or more provisioning carts 910, loading information related to one or more different provisions being loaded on the provisioning cart 910 (e.g., identifying a time or a place when a particular provisioning cart received one or more provisions), unloading information related to one or more different provisions being unloaded from the provisioning cart 910 (e.g., identifying a time or a place when a particular provisioning cart provided one or more provisions), location information related to a location or a location history of one or more provisioning carts 910, or the like. The one or more servers 920 may receive information (e.g., direct, indirectly) for storage from each of the one or more provisioning carts 910. The one or more servers 920 may receive information associated with each of the one or more provisioning carts 910 and generate the received information for display on a display screen. For example, the one or more servers 920 may generate information related to one or more provisioning carts 910 for display and transmit the information to a display screen on a video monitor or a hand-held electronic device.

In certain embodiments, the network context 900 includes one or more provisioning carts 910. The one or more provisioning carts 910 may include one or more features of the provisioning carts described herein. The one or more provisioning carts 910 may include a first provisioning cart 910a, a second provisioning cart 910b, a third provisioning cart 910c, and a fourth provisioning cart 910d. In certain embodiments, each of the one or more provisioning carts 910 is configured to communicate data with the one or more servers 920 through the network 905. In certain embodiments, each of the one or more provisioning carts 910 are configured to execute one or more provision distribution operations. In certain embodiments, each of the provisioning carts 910 includes an electronic device display screen, an electronic device memory, and at least one electronic device processor.

In certain embodiments, each of the one or more provisioning carts 910 includes a computing system 915. For example, the first provisioning cart 910a includes a first computing system 915a, the second provisioning cart 910b includes a second computing system 915b, the third provisioning cart 910c includes a third computing system 915c, and the fourth provisioning cart 910d includes a fourth computing system 915d. Each of the computing systems 915 may include an electronic device memory and at least one electronic device processor to execute one or more provision distribution operations described herein.

Figure 10:
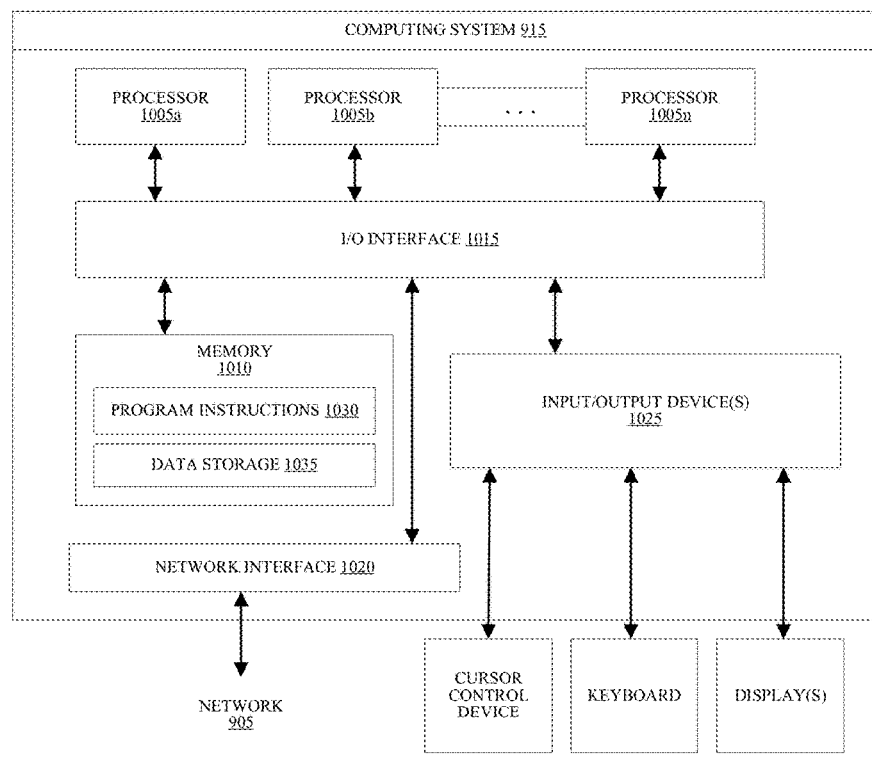
FIG. 10 illustrates a non-limiting, example computing system for performing provision distribution operations according to certain embodiments of this disclosure.

FIG. 10 illustrates a non-limiting, example of the computing system 915 illustrated in FIG. 9. The computing system 915 is configured to execute any and all of the embodiments and operations described herein including embodiments for performing one or more provision distribution operations. In certain embodiments, the computing system 915 may perform one or more provision distribution operations using at least one of the network 905 or a user input interface to determine an initial quantity of a provision stored within a provisioning cart, detect a quantity change of the provision stored within the provisioning cart, determine a location of the provisioning cart when detecting the quantity change, determine a subsequent quantity of the provision stored in the provisioning cart after detecting the quantity change, and generate for display on a display screen the location of the provisioning cart and the subsequent quantity after detecting the quantity change. In different embodiments, the computing system 915 may be any of various types of devices, including, but not limited to, an embedded computer or in general any type of electronic computing device.

Various embodiments of a system and method for performing provision distribution operations, as described herein, may be executed on one or more computing systems 915, which may interact with various other devices. In the illustrated embodiment, the computing system 915 may include one or more processors 1005a, 1005b, . . . , and 1005n (hereinafter "one or more processors 1005," "processors 1005," or "processor 1005") coupled to a memory 1010 via an input/output (I/O) interface 1015. The computing system 915 may further include a network interface 1020 coupled to I/O interface 1015, and one or more input/output devices 1025, such as cursor control device of the provisioning cart 910, a keyboard of the provisioning cart 910, and one or more displays of the provisioning cart 910. In some cases, it is contemplated that embodiments may be implemented using a single instance of the computing system 915, while in other embodiments multiple such systems, or multiple nodes making up the computing system 915, may be configured to host different portions or instances of embodiments. For example, in one embodiment some elements may be implemented via one or more nodes of the computing system 915 that are distinct from those nodes implementing other elements.

In various embodiments, the computing system 915 may be a uniprocessor system including one processor 1005a, or a multiprocessor system including several processors 1005a-1005n (e.g., two, four, five, eight, or another suitable number). The processor 1005 may be any suitable processor capable of executing instructions or operations including provision distribution operations as described herein. For example, in various embodiments the processor 1005 may be general-purpose or embedded processors implementing any of a variety of instruction set architectures (ISAs), such as the x86, PowerPC, SPARC, or MIPS ISAs, or any other suitable ISA. In multiprocessor systems, each of processors 1005 may commonly, but not necessarily, implement the same ISA.

The memory 1010 may be configured to store the executable instructions or program instructions 1030 in the data storage 1035 accessible by the processor 1005. In various embodiments, the memory 1010 may be implemented using any suitable memory technology, such as static random access memory (SRAM), synchronous dynamic RAM (SDRAM), nonvolatile/Flash-type memory, or any other type of memory. In the illustrated embodiment, the program instructions 1030 may be configured to implement a system for performing provision distribution operations incorporating any of the functionality, as described herein. In some embodiments, program instructions 1030 or data may be received, sent, or stored upon different types of computer-accessible media or on similar media separate from the memory 1010 or the computing system 915. The computing system 915 is described as implementing at least some of the functionality of functional blocks in the figure(s) described herein.

In certain embodiments, the I/O interface 1015 may be configured to coordinate I/O traffic between the processor 1005, the memory 1010, and any peripheral devices in the computing system 915, including the network interface 1020 or other peripheral interfaces, such as the input/output devices 1025. In some embodiments, the I/O interface 1015 may perform any necessary protocol, timing or other data transformations to convert data signals from one component (e.g., the memory 1010) into a format suitable for use by another component (e.g., the processor 1005). In some embodiments, the I/O interface 1015 may include support for devices attached through various types of peripheral buses, such as a variant of the Peripheral Component Interconnect (PCI) bus standard or the Universal Serial Bus (USB) standard, for example. In some embodiments, the function of the I/O interface 1015 may be split into two or more separate components, such as a north bridge and a south bridge, for example. Also, in some embodiments some or all of the functionality of the I/O interface 1015, such as an interface to the memory 1010, may be incorporated directly into the processor 1005.

The network interface 1020 may be configured to allow data to be exchanged between the computing system 915 and other devices attached to the network 905 (e.g., one or more servers 920) or between nodes of the computing system 915. The network 905 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1020 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 1025 may, in some embodiments, include one or more display terminals, keyboards, keypads, touchpads, scanning devices, voice, or optical recognition devices, or any other devices suitable for entering or accessing data by one or more computing systems 915. Further, various other sensors may be included in the I/O devices 1025, such as imaging sensors, barometers, altimeters, LIDAR, or any suitable environmental sensor.

Multiple input/output devices 1025 may be present in the computing system 915 or may be distributed on various nodes of the computing system 915. In some embodiments, similar input/output devices may be separate from the computing system 915 and may interact with one or more nodes of the computing system 915 through a wired or wireless connection, such as over the network interface 1020.

As shown in FIG. 10, the memory 1010 may include program instructions 1030, which may be processor-executable to implement any element, action, or operation including provision distribution operations, as described herein. In certain embodiment, the program instructions 1030 may implement at least a portion of methods described herein, such as the method(s) illustrated in FIG. 11. In other embodiments, different elements and data may be included. Note that the data storage 1035 may include any data or information, as described herein.

Those skilled in the art will appreciate that the computing system 915 is merely illustrative and is not intended to limit the scope of embodiments. In particular, the computing system 915 and devices may include any combination of hardware or software that can perform the indicated functions, including computers, network devices, Internet appliances, PDAs, wireless phones, pagers, GPUs, specialized computer systems, information handling apparatuses, or the like. The computing system 915 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between a memory and other storage devices for purposes of memory management and data integrity. Alternatively, in other embodiments some or all of the software components may execute in a memory on another device and may communicate with the illustrated computing system 115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 115 may be transmitted to the computing system 115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Figure 11:
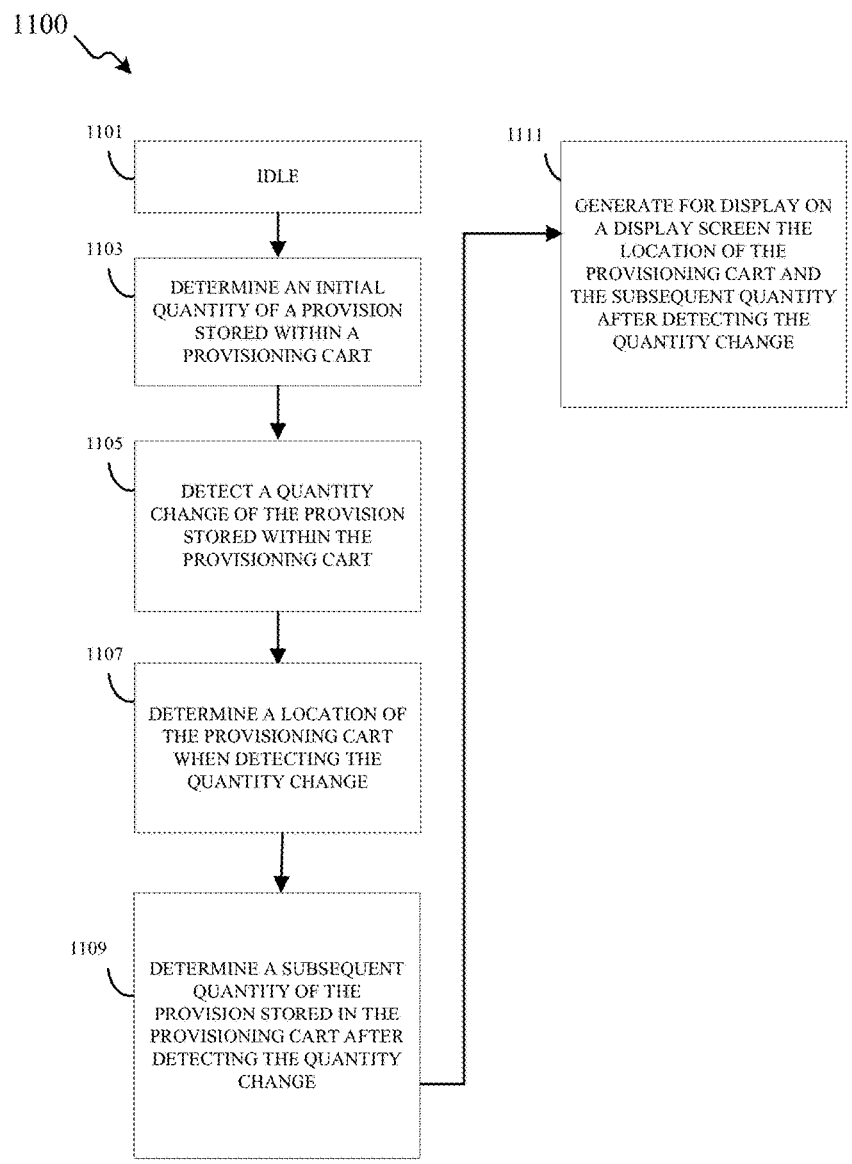
FIG. 11 illustrates a non-limiting, example method for performing provision distribution operations according to certain embodiments of this disclosure.

As described herein, the computing system 915, utilizing the at least one processor 1005, is configured to execute one or more provision distribution operations. FIG. 11 illustrates a non-limiting, example method 1100, implemented by the computing system 915, utilizing the at least one processor 1005, for performing one or more provision distribution operations according to certain embodiments of this disclosure. Although certain details will be provided with reference to the method 1100 of FIG. 11, it should be understood that other embodiments may include more, less, or different method steps. In certain embodiments, the method 1100 may be implemented by a computing system 915 of a provisioning cart 910. At step 1101, the computing system 915 is in an idle state at least with respect to performing one or more provision distribution operations.

At step 1103, the computing system 915 determines an initial quantity of a provision stored within a provisioning cart 910. For example, the computing system 915 may utilize one or more sensors, described herein, to determine an initial quantity of a provision stored within the provisioning cart 910. In certain embodiments, the computing system 915 may determine an initial quantity of a particular provision based on receiving one or more signals from the one or more particular or identified sensors. In certain embodiments, the computing system 915 may determine a time when the computing system 915 determines an initial quantity of a stored provision within the provisioning cart 910. The initial quantity of a provision may be a provision stored in a particular receptacle (e.g., an identified bin, an identified drawer, an identified hopper, an identified tray) of the provisioning cart 910.

At step 1105, the computing system 915 determines a quantity change of the provision stored within the provisioning cart 910. For example, the computing system 915 may determine that one or more provisions have been added into one or more hoppers within the provisioning cart 910 or that one or more provisions have been removed from one or more hoppers within the provisioning cart 910. In certain embodiments, the computing system 915 may determine a time when the computing system 915 determines a quantity change of a stored provision within the provisioning cart 910.

At step 1107, the computing system 915 determines a location of the provisioning cart 910 when detecting the quantity change of a provision. In certain embodiments, the computing system 115 of the provisioning cart 910 determines a location of the provisioning cart 910 relative to one or more nodes within a transportation facility. A transportation facility may include a plurality of nodes dispersed throughout the transportation facility. Nodes may be placed at one or more transportation facility gates or one or more transportation facility provision storage locations. Each of the one or more nodes may transmit a beacon signal that extends to a range from each node. The computing system 915 may receive beacon signals from one or more nodes and determine that the provisioning cart 910 is closest to a particular node among the one or more nodes based on a particular beacon signal having a signal strength that is greater than a signal strength of the other received beacon signals. The computing system 915 may determine that the location of the provisioning cart 910 is at or nearest to the particular node that transmitted the beacon signal with the greatest signal strength. The computer system 915 may determine the location of provisioning cart 910 based on knowing or identifying the location of the particular node that transmitted the beacon signal with the greatest signal strength. In certain embodiments, the computing system 915 may determine that the provisioning cart 910 is not within a transportation facility or within a predetermined distance of a transportation facility when the computing system 915 does not receive a beacon signal from one or more of the nodes.

Additionally, or alternatively, the computing system 915 may receive beacon signals from one or more nodes and determine that the provisioning cart 910 is within a predetermined distance from a particular node among the one or more nodes based on the particular beacon signal having a signal strength that is greater than a signal strength threshold. The computing system 915 may determine that the location of the provisioning cart 910 is within a predetermined distance of the particular node that transmitted the beacon signal with the signal strength that is greater than the signal strength threshold. The computer system 915 may determine the location of provisioning cart 910 based on knowing or identifying the location of the particular node that transmitted the beacon signal with the signal strength that is greater than the signal strength threshold. In certain embodiments, the computing system 915 may determine that the provisioning cart 910 is not within a transportation facility or within a predetermined distance of a transportation facility when the computing system 915 does not receive a beacon signal that has a signal strength that is above the signal strength threshold.

In certain embodiments, the computing system 915 of the provisioning cart 910 determines the location of the provisioning cart 910 using one or more global positioning systems (GPSs) or one or more wireless communication systems. For example, the computing system 915 to the provisioning cart 910 may use one or more GPSs or one or more wireless communication systems to determine that the provisioning cart 910 is located at or near a transport vehicle or is moving from the transport vehicle to a provision storage facility to replenish with provisions. As another example, the computing system 915 of the provisioning cart 910 may use one or more GPSs or one or more wireless communication systems to determine that the provisioning cart 910 is located at or near a provision storage facility to receive provisions for use on a transport vehicle or is moving from the provision storage facility to a transport vehicle to provide provisions to the transport vehicle.

At step 1109, the computing system 915 determines a subsequent quantity of the provision stored in the provisioning cart after detecting the quantity change. For example, the computing system 915 may utilize one or more sensors, described herein, to determine a subsequent quantity of a provision stored within the provisioning cart 910. In certain embodiments, the computing system 915 may determine a subsequent quantity of a particular provision based on receiving one or more signals from the one or more particular or identified sensors. In certain embodiments, the computing system 915 may determine a time when the computing system 915 determines a subsequent quantity of a stored provision within the provisioning cart 910. The subsequent quantity of a provision may be a provision stored in a particular receptacle (e.g., an identified bin, an identified drawer, an identified hopper, an identified tray) of the provisioning cart 910. In certain embodiments, the subsequent quantity of a provision may be a measured quantity of a provision that is measured after an initial quantity of the same provision is measured.

At step 1111, the computing system 915 may generate, for display on a display screen, information associated with one or more provisions stored in the respective provisioning cart 910 or the provisioning cart 910 itself after detecting a quantity change of a provision within the respective provisioning cart 910. The information may including at least one of an identification of the provision that is associated the quantity change, a location (e.g., a gate at a transportation facility, a transportation number associated with a transport vehicle) of the provisioning cart 910 when the quantity of the provision changed from the initial quantity to the subsequent quantity, a time when the quantity of the provision changed from the initial quantity to the subsequent quantity, a current location of the provisioning cart 910, a previously location of the provisioning cart 910, a scheduled future location of the provisioning cart 910, the initial quantity of the provision stored in the provisioning cart 910, the subsequent quantity of the provision stored in the provisioning cart 910, or the like. In certain embodiments, the computing system 915 generates the information on a display screen attached the provisioning cart 910. In certain embodiments, the computing system 915 transmits the information to a server 920. The server 920 receives the information and transmits the information to one or more display screens for viewing on one or more mounted monitors or for viewing on one or more portable electronic devices. It should be understood that the information associated with the one or more provisions may include information associated with each provision stored in a particular provisioning cart 910 so that when the information is displayed on a display screen a viewer may be able to determine which provisions are low and which provisions are not low concerning specific provisions for each of a plurality of provisioning carts 910 scattered around a large transportation facility.

Figure 12:
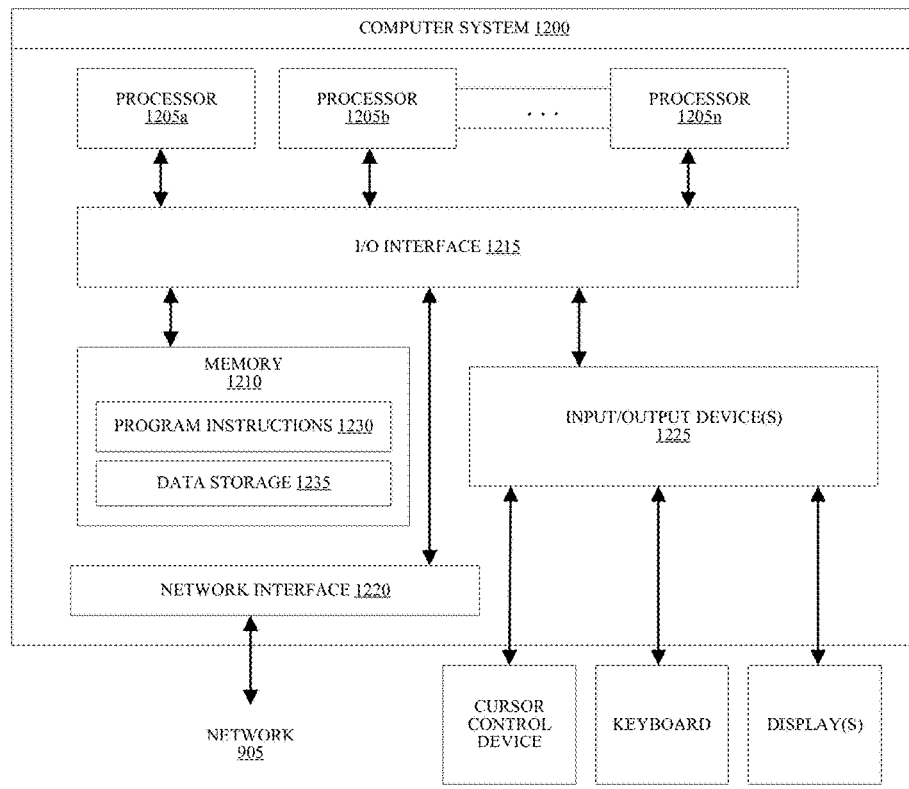
FIG. 12 illustrates a non-limiting, example computer system configured to implement aspects of apparatuses, systems, and methods according to certain embodiments of this disclosure.

FIG. 12 illustrates a non-limiting, example computer system 1200 configured to implement systems and methods for performing one or more provision distribution operations according to certain embodiments of this disclosure. FIG. 12 illustrates a computer system 1200 that is configured to execute any and all of the embodiments described herein. In certain embodiments, the computer system 1200 describes at least some of the components of provisioning cart 910 or the computing system 915 illustrated in FIGS. 9 and 10. In certain embodiments, the computer system 1200 describes at least some of the components of one or more servers 920 illustrated in FIG. 9. In different embodiments, the computer system 1200 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device, an application server, a storage device, a television, a peripheral device such as a switch, modem, router, or in general any type of computing or electronic device.

Various embodiments of a system and method for provision distribution operations, as described herein, may be executed on one or more computer systems 1200, which may interact with various other devices. In the illustrated embodiment, the computer system 1200 includes one or more processors 1205 coupled to a system memory 1210 via an input/output (I/O) interface 1215. The computer system 1200 further includes a network interface 1220 coupled to I/O interface 1215, and one or more input/output devices 1225, such as cursor control device, keyboard, and display(s). In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1205*a*, or a multiprocessor system including several processors 1205*a*-1205*n* (e.g., two, four, five, eight, or another suitable number). The processors 1205 may be any suitable processor capable of executing instructions. For example, in various embodiments the processors 1205 may be general-purpose or embedded processors implementing any of a variety of instruction set architectures (ISAs), such as the x86, PowerPC, SPARC, or MIPS ISAs, or any other suitable ISA. In multiprocessor systems, each of processors 1205 may commonly, but not necessarily, implement the same ISA.

The system memory 1210 may be configured to store the program instructions 1230 in the data storage 1235 accessible by the processor 1205. In various embodiments, the system memory 1210 may be implemented using any suitable memory technology, such as static random access memory (SRAM), synchronous dynamic RAM (SDRAM), nonvolatile/Flash-type memory, or any other type of memory. In the illustrated embodiment, the program instructions 1230 may be configured to implement a system for performing one or more provision distribution operations incorporating any of the functionality, as described herein. In some embodiments, program instructions and/or data may be received, sent, or stored upon different types of computer-accessible media or on similar media separate from the system memory 1210 or the computer system 1200. The computer system 1200 is described as implementing at least some of the functionality of functional blocks of previous Figure(s).

In one embodiment, the I/O interface 1215 may be configured to coordinate I/O traffic between the processor 1205, the system memory 1210, and any peripheral devices in the device, including the network interface 1220 or other peripheral interfaces, such as the input/output devices 1225. In some embodiments, the I/O interface 1215 may perform any necessary protocol, timing or other data transformations to convert data signals from one component (e.g., the system memory 1210) into a format suitable for use by another component (e.g., the processor 1205). In some embodiments, the I/O interface 1215 may include support for devices attached through various types of peripheral buses, such as a variant of the Peripheral Component Interconnect (PCI) bus standard or the Universal Serial Bus (USB) standard, for example. In some embodiments, the function of the I/O interface 1215 may be split into two or more separate components, such as a north bridge and a south bridge, for example. Also, in some embodiments some or all of the functionality of the I/O interface 1215, such as an interface to the system memory 1210, may be incorporated directly into the processor 1205.

The network interface 1220 may be configured to allow data to be exchanged between the computer system 1200 and other devices attached to a network (e.g., the network 905) or between nodes of the computer system 1200. The network 905 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 1225 may, in some embodiments, include one or more display terminals, keyboards, keypads, touchpads, scanning devices, voice, or optical recognition devices, or any other devices suitable for entering or accessing data by one or more the computer systems 1200. Further, various other sensors may be included in the I/O devices 1225, such as imaging sensors, barometers, altimeters, LIDAR, or any suitable environmental sensor. Multiple input/output devices 1225 may be present in the computer system 1200 or may be distributed on various nodes of the computer system 1200. In some embodiments, similar input/output devices may be separate from the computer system 1200 and may interact with one or more nodes of the computer system 1200 through a wired or wireless connection, such as over the network interface 1220.

As shown in FIG. 12, the memory 1210 may include program instructions 1230, which may be processor-executable to implement any element or action described herein. In one embodiment, the program instructions may implement at least a portion of methods described herein, such as the method(s) illustrated in FIG. 11. In other embodiments, different elements and data may be included. Note that the data storage 1235 may include any data or information described herein.

Those skilled in the art will appreciate that the computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 1200 may be transmitted to the computer system 1200 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "interface," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A cart for restocking provisions, the cart comprising:
 a body having one or more exterior surfaces, wherein the one or more exterior surfaces include:
  a top surface facing a first direction,
  a bottom surface facing a second direction that is away from the first direction and parallel to the first direction, and
  a side surface facing a third direction that is not parallel to the first direction and the second direction;
 a handle fixedly attached to the body;
 one or more wheels coupled to the bottom surface; and
 one or more hoppers each including a hollow space having a length that extends from an aperture located on the side surface and through at least a portion of an interior of the body, wherein the hollow space includes at least one curved surface that extends from the aperture and along at least a portion of the length to allow the provisions to be stored within the one or more hoppers.

2. The cart of claim 1, wherein the aperture is a first aperture, and wherein the length extends from the first aperture, through the interior of the body, and to a second aperture located on the top surface of the one or more exterior surfaces.

3. The cart of claim 2, wherein the at least one curved surface extends the length of the hollow space.

4. The cart of claim 1, further comprising a door coupled to the side surface, wherein the door is configured to pivot between an open position and a closed position, wherein when the door is in the open position, the hollow space is exposed to an area that is exterior to the body through a second aperture, and wherein when the door is in the closed position, the hollow space is not exposed to the area that is exterior to the body through the second aperture.

5. The cart of claim 1, wherein the one or more wheels extend from the body and towards the second direction.

6. The cart of claim 1, wherein a cross-sectional area of the hollow space includes a rectangular cross-sectional area.

7. The cart of claim 1, wherein the at least one curved surface comprises a constant curvature along at least the portion of the length.

8. The cart of claim 1, wherein a curvature of the at least one curved surface decreases from the aperture along at least the portion of the length.

9. The cart of claim 1, wherein when the at least one curved surface extends from the aperture along only the portion of the length, the at least one curved surface transitions to a surface with no curvature along at least some of a remaining portion of the length.

10. The cart of claim 1, wherein when the at least one curved surface extends from the aperture along only the portion of the length, the at least one curved surface transitions to a surface with no curvature beyond the portion of the length.

11. A cart for restocking provisions, the cart comprising:
 a body having one or more exterior surfaces, wherein the one or more exterior surfaces include:
  a top surface facing a first direction,
  a bottom surface facing a second direction that is away from the first direction and parallel to the first direction, and
  a side surface facing a third direction that is not parallel to the first direction and the second direction;
 a handle fixedly attached to the body;
 one or more wheels coupled to the bottom surface; and
 one or more hoppers each including a hollow space having a length that extends from a first aperture located on the top surface, through an interior of the body, and to a second aperture located on the side surface, wherein the hollow space includes at least one curved surface that extends from the first aperture along at least a portion of the length to allow the provisions to be stored within the one or more hoppers.

12. The cart of claim 11, wherein the at least one curved surface extends the length of the hollow space.

13. The cart of claim 11, further comprising a door coupled to the side surface, wherein the door is configured to pivot between an open position and a closed position, wherein when the door is in the open position, the hollow space is exposed to an area that is exterior to the body through the second aperture, and wherein when the door is in the closed position, the hollow space is not exposed to the area that is exterior to the body through the second aperture.

14. The cart of claim 11, wherein the one or more wheels extend from the body and towards the second direction.

15. The cart of claim 11, wherein a cross-sectional area of the hollow space includes a rectangular cross-sectional area.

16. A cart for restocking provisions, the cart comprising:
a body having one or more exterior surfaces;
a handle fixedly attached to the body;
one or more wheels coupled to the body; and
one or more hoppers each including a hollow space having a length that extends from an aperture located on at least one exterior surface of the one or more exterior surfaces and through at least a portion of an interior of the body, wherein the hollow space includes at least one curved surface that extends from the aperture along the length to allow the provisions to be stored within the one or more hoppers; and
at least one door, when in an open position, configured to:
provide access to the one or more hoppers through the aperture, and
extend away from the at least one exterior surface of the one or more exterior surfaces of the body forming a canopy for shielding an area that is exterior to the body and adjacent the aperture from environmental elements.

17. The cart of claim 16, wherein the one or more exterior surfaces comprise:

a top surface facing a first direction;
a bottom surface facing a second direction that is away from the first direction and parallel to the first direction; and
a side surface facing a third direction that is not parallel to the first direction and the second direction.

18. The cart of claim 17, wherein the aperture is located on the side surface.

19. The cart of claim 17, wherein the one or more wheels are coupled to the bottom surface.

20. The cart of claim 17, wherein the one or more exterior surfaces further comprise a side surface facing a third direction that is not parallel to the first direction and the second direction.

21. The cart of claim 20, wherein the door is configured to pivot between the open position and a closed position, wherein when the door is in the open position, the hollow space is exposed to the area that is exterior to the body through the aperture, and wherein when the door is in the closed position, the hollow space is not exposed to the area that is exterior to the body through the aperture.

22. The cart of claim 16, wherein the aperture is a first aperture, wherein the at least one exterior surface of the one or more exterior surfaces is a side surface, and wherein the length extends from the first aperture located on the side surface of the one or more exterior surfaces, through the interior of the body, and to a second aperture located on a top surface.

23. The cart of claim 16, wherein a cross-sectional area of the hollow space includes a rectangular cross-sectional area.

* * * * *